United States Patent
Forshaw et al.

(10) Patent No.: US 8,704,110 B2
(45) Date of Patent: Apr. 22, 2014

(54) ELECTRONIC WEIGHING DEVICE AND SERVER SYSTEM

(75) Inventors: Michael E. Forshaw, N. Las Vegas, NV (US); Kenneth G. Lawrence, Tarzana, CA (US); James R. Fabbro, Reseda, CA (US)

(73) Assignee: OVS, Inc., Tarzana, CA (US)

( * ) Notice: Subject to any disclaimer, the term of this patent is extended or adjusted under 35 U.S.C. 154(b) by 600 days.

(21) Appl. No.: 12/892,707

(22) Filed: Sep. 28, 2010

(65) Prior Publication Data
US 2011/0240379 A1 Oct. 6, 2011

Related U.S. Application Data

(60) Provisional application No. 61/320,659, filed on Apr. 2, 2010.

(51) Int. Cl.
| | |
|---|---|
| *A61B 5/00* | (2006.01) |
| *G06F 13/00* | (2006.01) |
| *G01G 19/414* | (2006.01) |
| *G01G 19/415* | (2006.01) |
| *G01G 19/44* | (2006.01) |
| *G01G 21/28* | (2006.01) |

(52) U.S. Cl.
USPC .................... 177/25.13; 600/300; 177/25.19; 177/238; 177/245

(58) Field of Classification Search
USPC ............ 600/300; 177/25.13, 25.19, 245, 238
See application file for complete search history.

(56) References Cited

U.S. PATENT DOCUMENTS

| | | | | |
|---|---|---|---|---|
| 6,038,465 A | * | 3/2000 | Melton, Jr. ............... | 600/407 |
| 6,256,532 B1 | * | 7/2001 | Cha ............................. | 600/547 |

(Continued)

FOREIGN PATENT DOCUMENTS

| | | | | |
|---|---|---|---|---|
| WO | WO 2008/049068 | * | 4/2008 | A61B 5/00 |

OTHER PUBLICATIONS

1999 Metropolitan Height and Weight Tables for Men and Women, based on "Build Study, 1979," compiled by the Society of Actuaries and Association of Life Insurance Medical Directors of America, Society of Actuaries, 1980, Chicago, downloaded at http://www.bcbst.com/mpmanual/!SSL!/WebHelp/HW.htm, download date Aug. 27, 2010.

(Continued)

*Primary Examiner* — Randy W Gibson
(74) *Attorney, Agent, or Firm* — Michael Zarrabian, Esq.; Sherman & Zarrabian LLP

(57) ABSTRACT

An electronic weighing device is provided. The electronic weighing device comprises an elongate frame; a head unit, wherein the head unit is supported by the frame. The electronic weighing device further includes a scale platform coupled to a base of the frame, and a load-cell module residing in the scale platform, wherein the load-cell module is configured to convert a force on the scale platform when a user stands on the scale platform, into a measurable electrical output signal. The electronic weighing device further includes an electronic display device in the head unit, an electronics module coupled to the load-cell module and to the electronic display device, wherein the electronics module is configured for interacting with a user via the electronic display device and determining the weight of the user based on an electrical output signal from the load-cell. The electronic weighing device further comprises a communication module configured for communicating with a remote device via a communication link.

41 Claims, 14 Drawing Sheets

(56) References Cited

U.S. PATENT DOCUMENTS

| | | | |
|---|---|---|---|
| 6,369,337 B1* | 4/2002 | Machiyama et al. | 177/25.13 |
| 6,403,897 B1* | 6/2002 | Bluth et al. | 177/144 |
| 6,576,849 B2* | 6/2003 | Bliss et al. | 177/25.13 |
| 6,612,984 B1* | 9/2003 | Kerr, II | 600/300 |
| 6,692,436 B1* | 2/2004 | Bluth et al. | 600/300 |
| 6,705,990 B1* | 3/2004 | Gallant et al. | 600/300 |
| 6,781,067 B2* | 8/2004 | Montagnino et al. | 177/25.13 |
| 6,942,616 B2* | 9/2005 | Kerr, II | 600/300 |
| 7,109,881 B2* | 9/2006 | Blum et al. | 340/815.4 |
| 7,170,016 B2* | 1/2007 | Dumornay et al. | 177/25.13 |
| 7,384,146 B2* | 6/2008 | Covannon et al. | 351/223 |
| 7,413,544 B2* | 8/2008 | Kerr, II | 600/300 |
| 7,541,547 B2* | 6/2009 | McGuire et al. | 177/25.13 |
| 7,550,682 B2* | 6/2009 | Lawler et al. | 177/25.16 |
| 7,988,627 B2* | 8/2011 | Bagan | 600/300 |
| 8,200,453 B2* | 6/2012 | Gage et al. | 702/173 |

OTHER PUBLICATIONS

Glenview Health Systems, "BioMeasure Adult Measuring System", Glenview Health Systems, Nov. 23, 2008, pp. 1-2, United States, http://www.glenhealth.net/adult/adult.htm (last visited Mar. 22, 2011).

OVS, Inc., Drawing of the Initial Prototype of the BioWeigher, OVS, Inc., publicly disclosed in 1999, pp. 1, United States.

Canadian Office Action dated May 5, 2013 for Canadian Application No. 2,715,412 from Canadian Intellectual Property Office, pp. 1-3, Canada.

* cited by examiner

ELECTRONIC WEIGHING DEVICE AND SERVER SYSTEM

CROSS REFERENCE TO RELATED APPLICATIONS

This application claims priority to U.S. Provisional Patent Application Ser. No. 61/320,659 filed on Apr. 2, 2010, incorporated herein by reference in its entirety.

BACKGROUND OF THE INVENTION

1. Field of the Invention

The present invention relates generally to weighing scales, and in particular, to electronic weighing scales.

2. Description of Related Art

Traditional scales for weighing a human being are generally portable units providing limited information. The scales do little more than show bodyweight in response to a user standing thereupon. Conventional scales typically utilize a compression spring.

BRIEF SUMMARY OF THE INVENTION

In one embodiment, the present invention provides an electronic weighing device, comprising an elongate frame; a head unit, wherein the head unit is supported by the frame; a scale platform coupled to a base of the frame; a load-cell module residing in the scale platform, wherein the load-cell module is configured to convert a force on the scale platform when a user stands on the scale platform, into a measurable electrical output signal; an electronic display device in the head unit; an electronics module coupled to the load-cell module and to the electronic display device, wherein the electronics module is configured for interacting with a user via the electronic display device and determining the weight of the user based on an electrical output signal from the load-cell; and a communication module configured for communicating with a remote device via a communication link.

In another embodiment, the present invention provides a method for electronically weighing a user, comprising: when a user stands on a scale platform of the electronic weighing device, generating output data including the weight of the user based on an electrical output signal from a load-cell in the scale platform, wherein the load-cell converts a force on the scale platform into a measurable electrical output signal; and transmitting the output data to a remote device via a communication link.

These and other features, aspects and advantages of the present invention will become understood with reference to the following description, appended claims, and accompanying figures.

DETAILED DESCRIPTION OF THE INVENTION

The following description is made for the purpose of illustrating the general principles of the present invention and is not meant to limit the inventive concepts claimed herein. Further, particular features described within can be used in combination with other described features in each of the various possible combinations and permutations. Unless otherwise specifically defined herein, all terms should be given their broadest possible interpretation including meanings implied from the specification as well as meanings understood by those skilled in the art and/or as defined in dictionaries, treatises, etc.

Embodiments of the invention provide an electronic weighing system, comprising a scale apparatus (device) and health monitoring processes implemented therein. In one embodiment, the electronic weighing system includes a scale device, a communication module for data communication (such as via Internet, cellular network, local area network, etc.), a user interface module such as a touch-screen driven by a user interface application, memory, and a storage module for storing information such as user data. In one embodiment, a touch-screen user interface device and a hardware processor module are embedded within the electronic weighing system (such as in the scale apparatus), wherein the processor implements a process for electronically weighing a user according to the invention.

Figure 1:
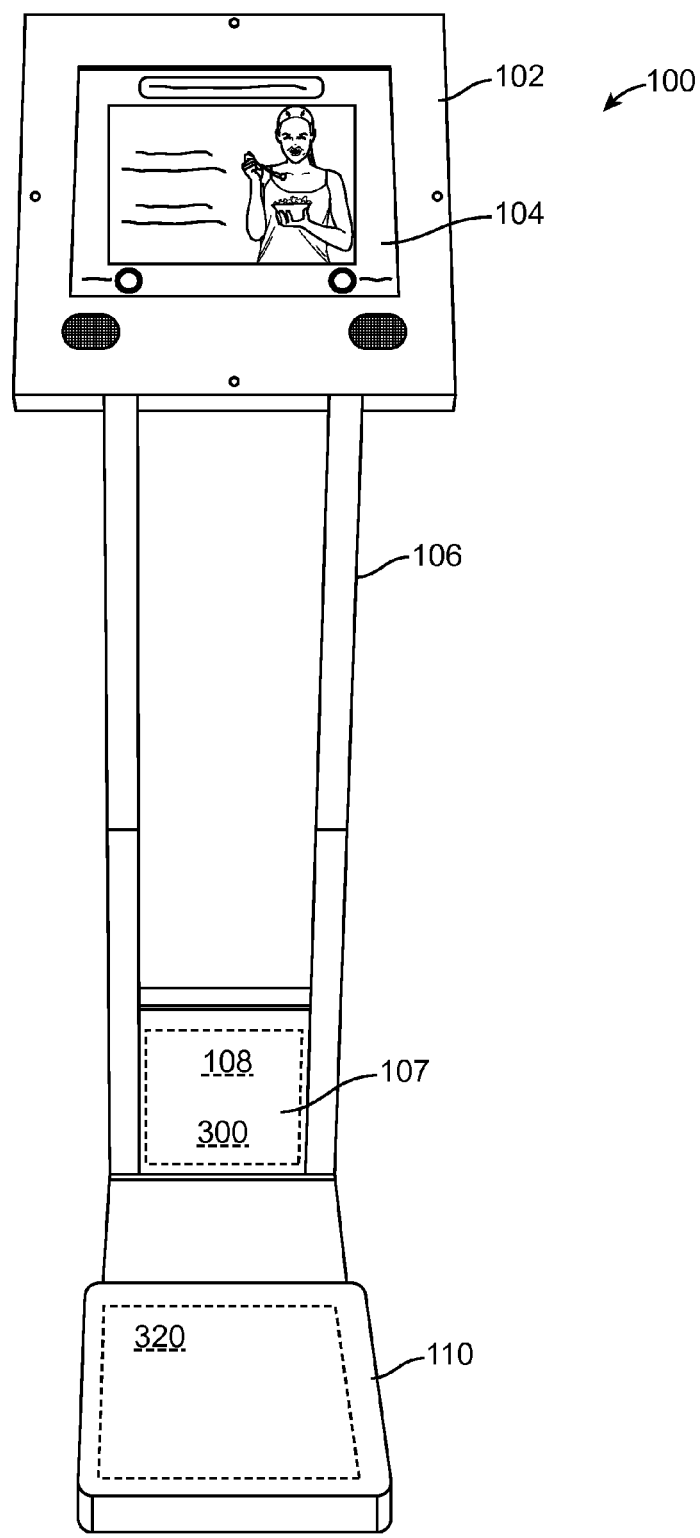
FIG. 1 illustrates a front view of an electronic weighing system, according to an embodiment of the present invention.
Figure 2:
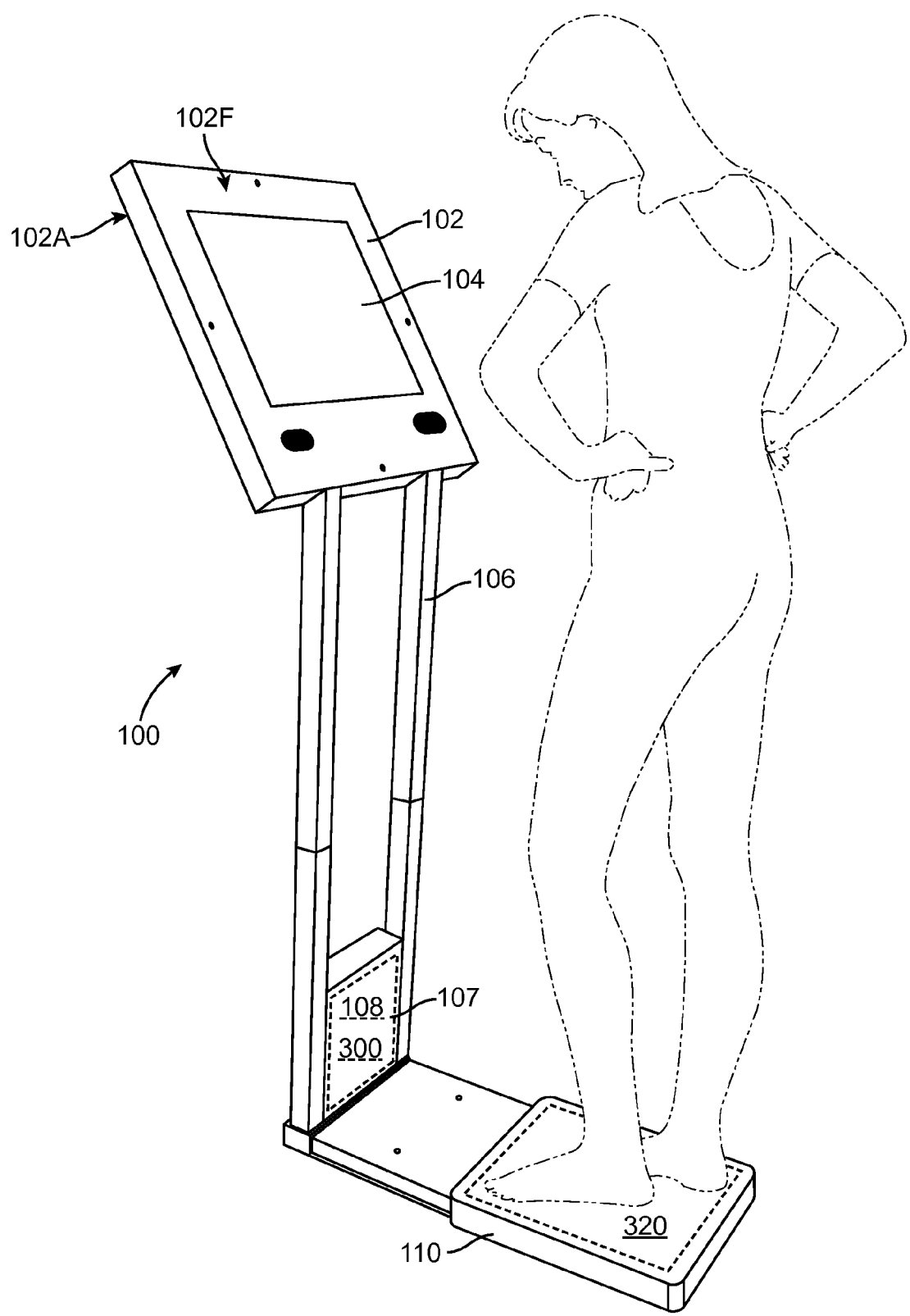
FIG. 2 illustrates a perspective view of the electronic weighing system, according to an embodiment of the present invention.

Referring now to the embodiments of the invention shown in the drawings, FIGS. 1 and 2 illustrate a front view and a perspective view of an electronic weighing system 100, respectively, according to an embodiment of the present invention. The electronic weighing system 100 comprises a scale having a head unit 102, an elongate frame 106 and a rectilinear box platform 110 having an essentially planar upper surface for a human user to stand on. The head unit 102 is attached to an upper portion of the frame 106. The base of the frame is attached to the platform 110, wherein the platform 110 further supporting the scale on a surface such as a floor or ground. In one embodiment, the head unit 102 comprises a rectilinear housing having a front face plate 102F and a back cover 102A (FIG. 2).

In one embodiment, the electronic weighing system 100 further comprises a housing 107 located proximate the lower portion of the frame 106, between the head unit 102 and the platform 110. The housing 107 contains a power module 108 and an electronics module 300 configured for providing electrical power and control to the electronic weighing system 100. The platform 110, located at the base of the frame 106, includes load-cell module 320.

The electronic weighing system 100 may be configurable in different ways, one of which is exemplified in FIGS. 1 and 2 as a kiosk-style scale having a touch-screen LCD device 104 in the head unit 102 as part of the user interface. The touch-screen LCD device 104 may comprise a high resolution touch-screen LCD optimally angled (e.g., about 30°+/−2°) on the frame 106 for user interface and interaction. In one embodiment, the frame 106 comprises hollow metal (e.g., aluminum, steel, etc.) which facilitates routing cables and/or wires (e.g., electrical, data, etc.) therein between components of the weighing system 100, such as between the power module 108, the load-cell 320, the head unit 102, and the electronics module 300. A user places his/her weight on the top surface of the platform 110, the force of the weight of the user is transferred to the load-cell 320 under the platform 110.

Figure 3:
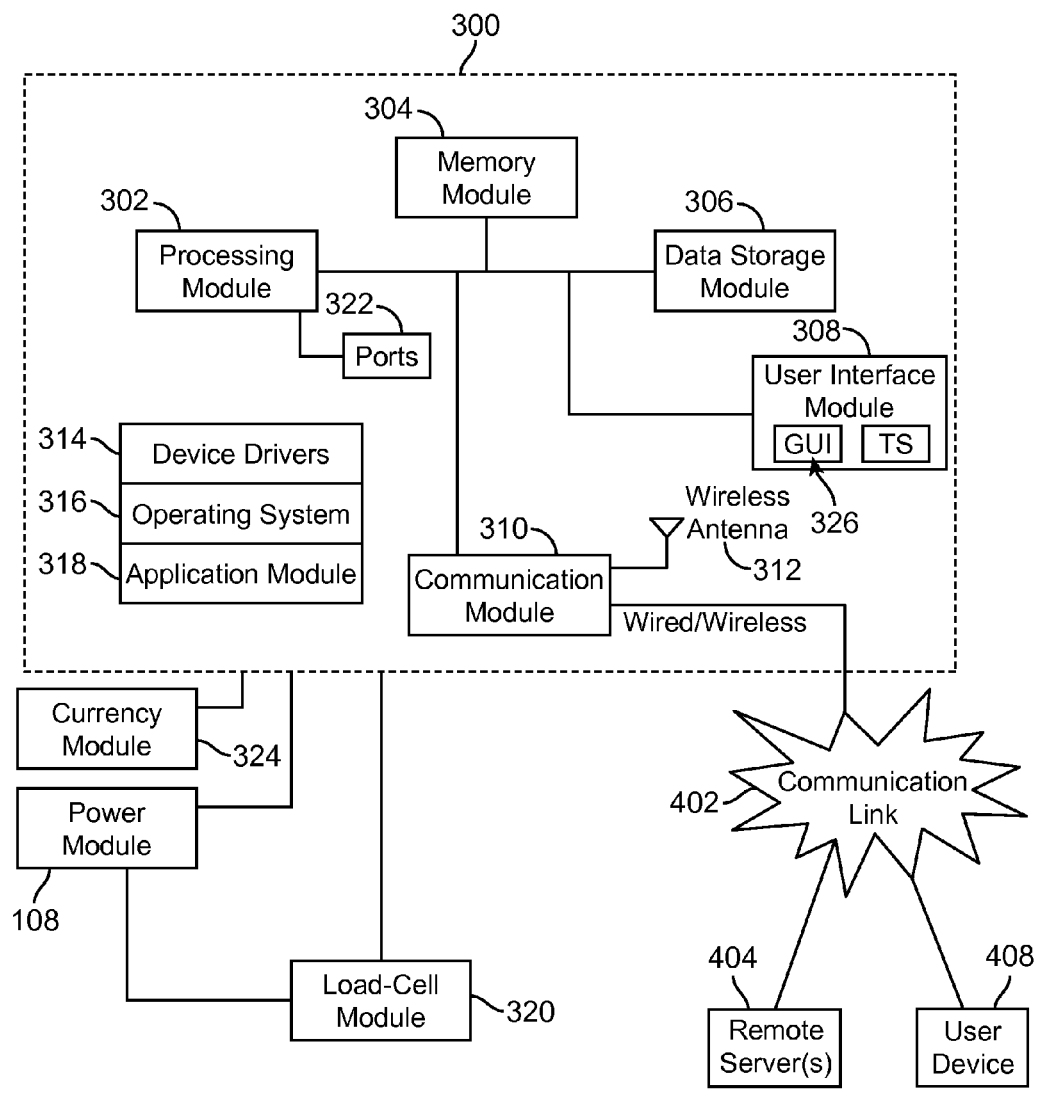
FIG. 3 illustrates a block diagram of an electronics module of the electronic weighing system, according to an embodiment of the present invention.

FIG. 3 illustrates a block diagram of the electronics module 300 of the electronic weighing system 100 (FIG. 1), according to an embodiment of the present invention. The electronics module 300 comprises a processing module 302 (e.g., CPU, processor, computer, etc.), a memory module 304 (e.g., RAM, ROM, EEPROM, etc.), a storage module 306 (e.g., disk drive, solid state disc (SSD), etc.), a communication module 310, along with a user interface module 308 including a graphical user interface (GUI) 326. The electronics module 300 further comprises device drivers 314, an operating system 316, and an application module 318.

In one embodiment, the communication module 310 may implement wireless communication, for example, according to IEEE 802.11 wireless standards, cellular communication, virtual private network (VPN), etc. In one embodiment, communication module 310 may include multiple wireless radios, each implementing a particular wireless communication scheme allowing the electronic weighing system 100 to establish wireless communication with diverse devices and/or networks, and further performed simultaneous communications via the multiple radios. In one embodiment, the communication module 310 may implement wireline communication such as Ethernet to establish wireless communication with diverse devices and/or networks. In another embodiment, the communication module may implement both wireless and wireline communication schemes.

In one embodiment, the application module 318 comprises hardware, software or combination of hardware and software, for configuring the processing module 302 to perform data processing and manage system components including the load-cell module 320, a currency module 324, the user interface module 308, the communication module 310, and the data storage module 306. The processing module 302 can also be configured to initialize and/or calibrate the load-cell module 320 using functions in the application module 318.

In one embodiment of the invention, the electronics module 300 further includes ports 322 (e.g., COM, USB, IEEE 1394, etc.) which facilitate communication with the optional currency module 324, the power module 108, and the load-cell module 320 coupled to the electronics module 300. The ports 320 may also facilitate communication between the electronics module 300 and one or more remote servers (e.g., servers 404, FIG. 4).

In one embodiment, the electronics module 300 interacts with the currency module 324, the power module 108, the load-cell module 322, and the remote server(s) 404, according to embodiments of the invention as described further below. In one embodiment, a remote server 404 may comprise a computer system including hardware processor, memory, storage devices, communication devices, network interfaces, operating system, software applications, application programs, web server modules, etc. In another embodiment, a remote server 404 may comprise an information technology system including multiple computer systems and database systems.

The load-cell module 320 comprises a transducer configured for converting force (e.g., a user weight) into a measurable electrical output, as well known in the art. In one example, the load-cell 320 is universal serial bus (USB) compliant transmitting weight information to a port 322 of the electronics module 300 via a cable routed through the frame 106, for processing by the processing module 302.

The application module 318 may access the load-cell module 320 (and optionally the currency module 324) via the ports 322. The processing module 302 is configured (e.g., by the application module 318) to control the user interface module 308 such that the touch-screen LCD device 104 (FIG. 2) displays the graphical user interface (GUI) 326. The GUI 326 comprises interfaces for displaying information such as data, graphics, multimedia information, and colorful animated renderings on the touch-screen LCD device 104 (FIG. 2) to attract users. The GUI 326 is further capable of displaying information and receiving input data from a user via the touch-screen LCD device 104 (FIG. 2). The weighing system 100 may further include a speaker system such as in the head unit 102 for providing audio information to the user, as controlled by the module 300.

In one embodiment, the processing module 302 is configured such that based on input data received from a user, from the load-cell module 320, and from other sources (e.g., Internet 402, remote server(s) 404, data storage module 306, etc.), the processing module 302 generates output data customized (tailored or personalized) for that user. Example user input data may include user profile information such as sex, height, age, date of birth (DOB), body shape (e.g., thin, stocky, athletic, etc.), activity level, etc. Example output data may include the current weight, ideal weight, body mass index (BMI), suggested caloric intake, and biorhythm cycle values, for the user standing on the platform 110. The data storage module 306 is configured to store various information such as the input data received from the user as well as the output data that is generated by the processing module 302. The processing module 302 also provides input and output interfaces for initializing the load-cell port 322, initializing the load-cell module 320, and calibration of the same.

In one embodiment of the present invention, the electronics module 300 tracks user payments using the currency module 324. When a user deposits currency to the currency module 324, the currency module 324 then triggers the processing module 302 to generate the aforementioned output data tailored to the user. In this embodiment the user interface module 308 may display limited or no advertisements to the user through the GUI 326. The electronics module 300 may also periodically transmit payment information to the remote server(s) 404 through the Internet 402.

In an alternative embodiment, a user may receive his/her tailored (customized or personal) output data generated by the processing module 302, without being required to pay currency. In this embodiment, the currency module 324 is either disabled and/or removed from the electronic weighing system 100 and the user interface module 308 may optionally display advertisements to the user through the GUI 326 for display on the touch-screen LCD device 104 (FIG. 1).

In one embodiment, the electronics module 300 can also customize advertisements displayed via the GUI 326, such as suggesting a specific product or establishment to the user based on information inputted by the user. For example, advertisements may include nutritional supplements, health club memberships, dietary supplements and/or programs, fitness equipment and/or apparel, local fitness activities, etc. In one embodiment of the invention, the products and establishments advertised may geographically reside within close proximity to the electronic weighing system 100 (FIG. 2).

Alternatively, the advertised products and establishments may reside within close proximity to the geographical location of the residence of the user. In one embodiment, advertisement data may reside in the data storage module 306 of the electronic weighing system 100 (FIG. 1), and may be selectively displayed on the GUI 326 based on input received from the user (e.g., sex, height, date of birth (DOB), body shape, activity level, etc.). Alternatively, advertisement data may reside on the remote server(s) 404 and be transmitted to the system 100 (FIG. 1) for display on the GUI 326 via a connection to the Internet 402.

The processing module 302, using the application module 318, can also dynamically customize advertisements based on user input. For example, if a user identifies his sex as male, advertisements displayed to the user can suggest male-based products and/or establishments. This feature can be implemented regardless of where the advertisement data resides (i.e., data storage module 306 or remote server(s) 404).

In one embodiment, the application module 318 implements functions that allow authorized personnel to monitor/view the currency collected by the currency module 324. The application module 318 may also allow authorized personnel to monitor information transmitted between the electronic weighing system 100 (FIG. 2) and remote server(s) 404 through the Internet 402.

In one embodiment of the invention, using the Internet 402 and communication module 310, a remote server 404 can dynamically modify (e.g., install, uninstall, update, upgrade, etc.) functionality of the application module 318 of the electronic weighing system 100 (FIG. 1). A remote server 404 may also modify (e.g., upload, download, overwrite, delete, etc.) data residing in the data storage module 306 of the electronic weighing system 100 (FIG. 1).

In one embodiment of the invention, the communication module 310 comprises a wireless communication module which utilizes the antenna 312 to provide wireless connectivity (e.g., radio frequency) to the Internet 402. The communication module 310 may utilize a fixed internet protocol (IP) address from an international Internet service provider (ISP) providing coverage over multiple countries (e.g. Canada, United States, Puerto Rico, etc.). In another embodiment, the communication module 310 comprises a wired communication module to provide wired connectivity to the Internet 402.

Figure 4:
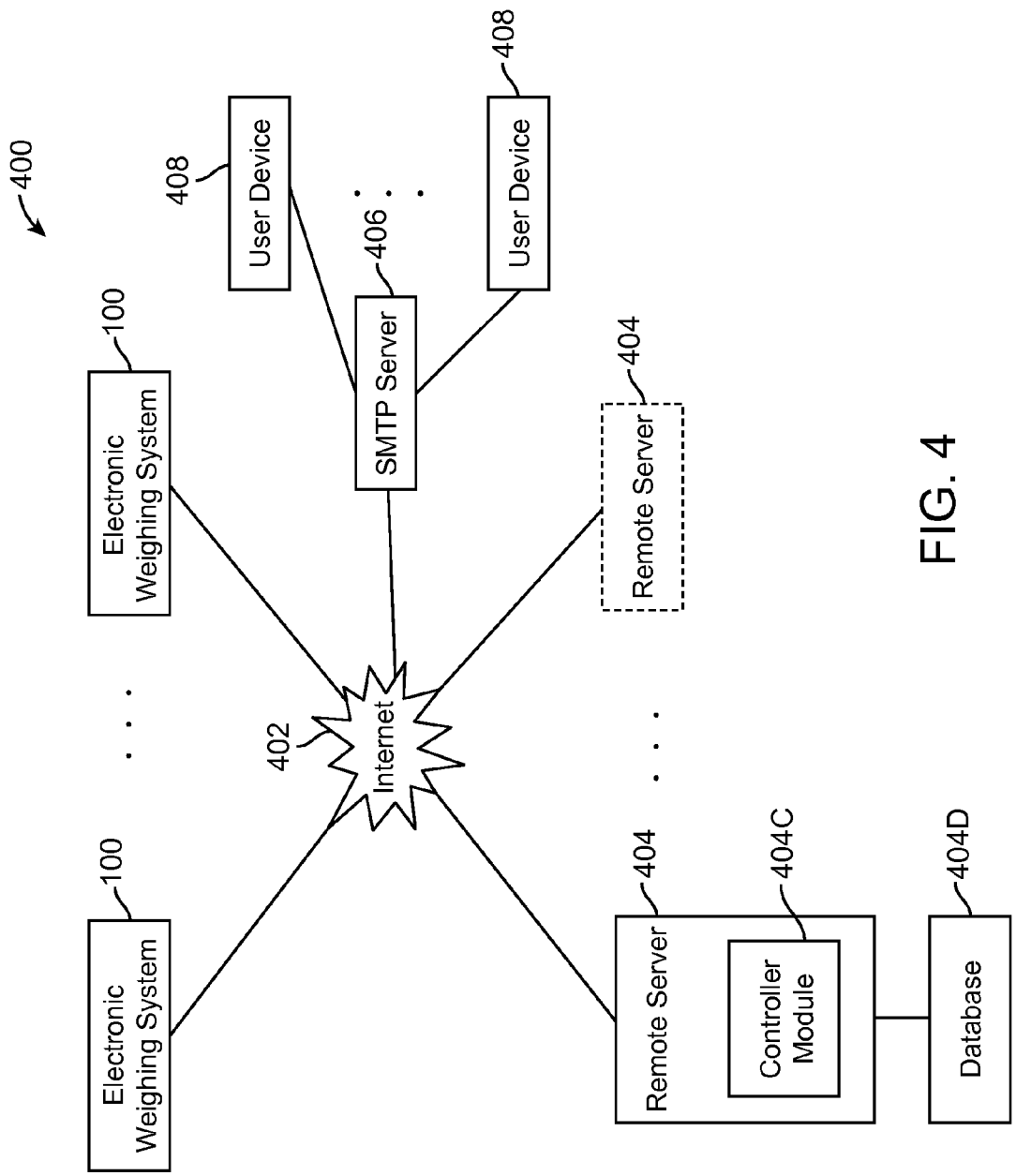
FIG. 4 illustrates a communication system for one or more of the electronic weighing systems, according to an embodiment of the present invention.

FIG. 4 illustrates a communication system 400 including one or more electronic weighing systems (i.e., electronic scales) 100, according to an embodiment of the present invention. In the system 400, each electronic weighing system 100 may be connected to the Internet 402 via its communication module 310 (FIG. 3) wherein the weighing system 100 is capable of communicating through the Internet 402 with at least one remote server 404. Each weighing system 100 is also capable of sending information (e.g., electronic mail, text message) to one or more user personal electronic devices (i.e., remote user devices) 408 such as cell phones, mobile electronic data communication devices, personal computers, etc., utilizing a Simple Mail Transfer Protocol (SMTP) server 406.

Further, one or more remote servers 404 are capable of communicating through the Internet 402 with one or more electronic weighing systems 100. For example, a remote server 404 may request that an electronic weighing system 100 to transfer user-inputted data for analysis and/or marketing. The requesting server includes functionality such as software/hardware for performing such analysis.

In one embodiment of the present invention, an electronic weighing system 100 captures information for each user of that weighing system 100, including, for example, location of the weighing system 100, selected language, date, time, sex, date of birth, height, body shape, activity level, weight, overweight/underweight, BMI, biorhythm cycle values, and email address. Requesting user data from the electronic weighing systems 100 by a remote server 404 may automatically occur periodically or alternatively authorized personnel may manually initiate such a request. Moreover, user data can be used to offer consumer products to a specific user. At an aggregate level, user data may also help determine a potential customer base for a retail establishment, health center, or any location the electronic weighing system 100 is utilized.

In another embodiment, information including user data may be transmitted from one or more electronic weighing systems 100 to one or more remote servers 400, automatically periodically, automatically on demand, or based on a command from authorized personnel.

Figure 5A:
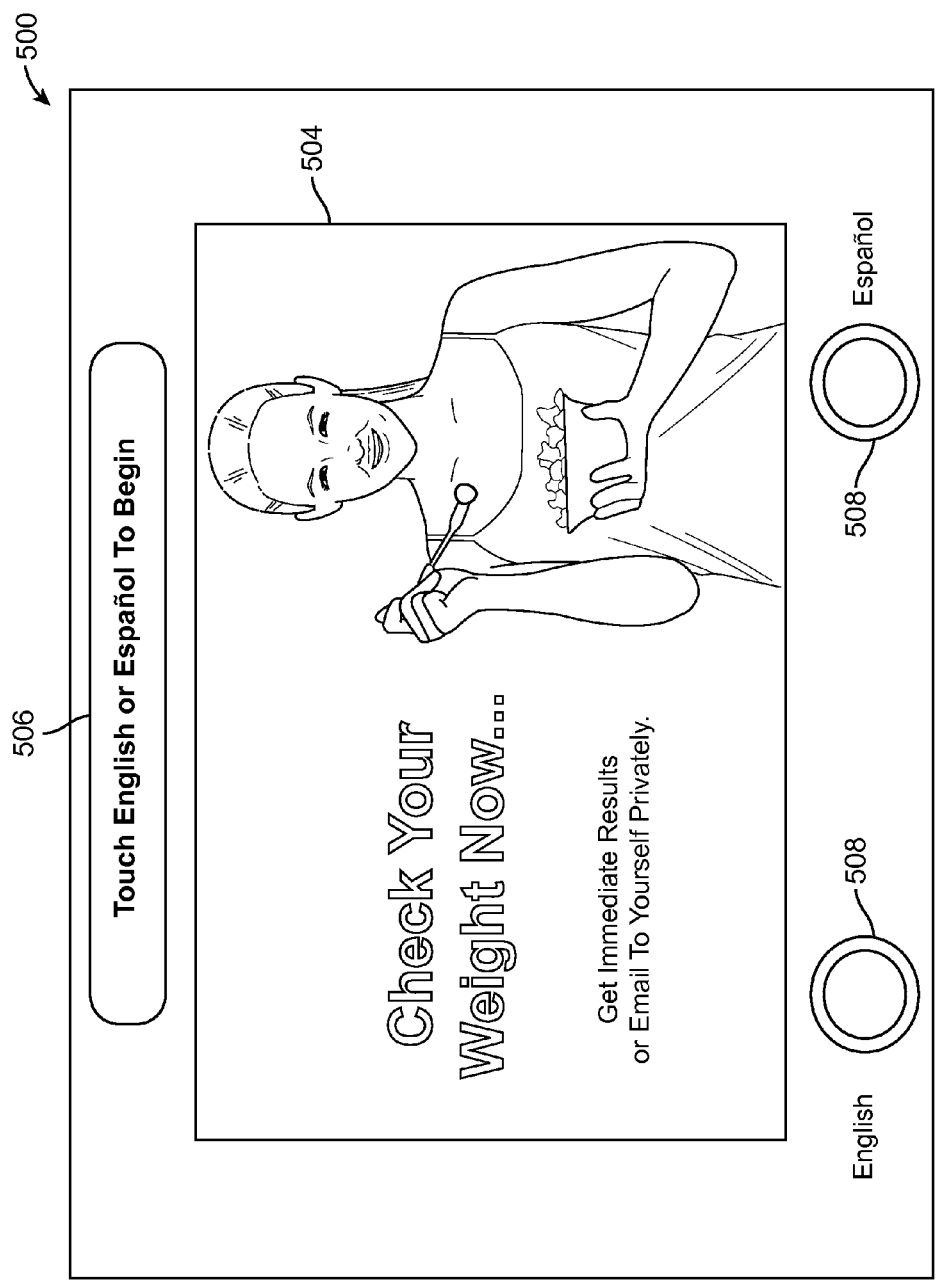
FIG. 5A illustrates a screen image generated by a graphical user interface (GUI) of the electronic weighing system for display on the touch-screen LCD device, according to an embodiment of the present invention.

FIG. 5A illustrates an example screen image 500 generated by the GUI 326 (FIG. 3) of the electronic weighing system 100 for display on the touch-screen LCD device 104 (FIG. 2), according to an embodiment of the present invention. In one example, the image 500 comprises information such as an advertisement 504, instructions 506 for interacting with the electronic weighing system 100 (FIG. 1), and language options 508, etc. In one example, the advertisement 504 invites a user to check his/her weight. The advertisement 504 may include multimedia information, images, text, video, audio, or combinations thereof. The instructions 506 describe how a user may interact with the electronic weighing system 100 (FIG. 2). The language options 508 provides a list of languages the electronic weighing system 100 can display.

Figure 5B:
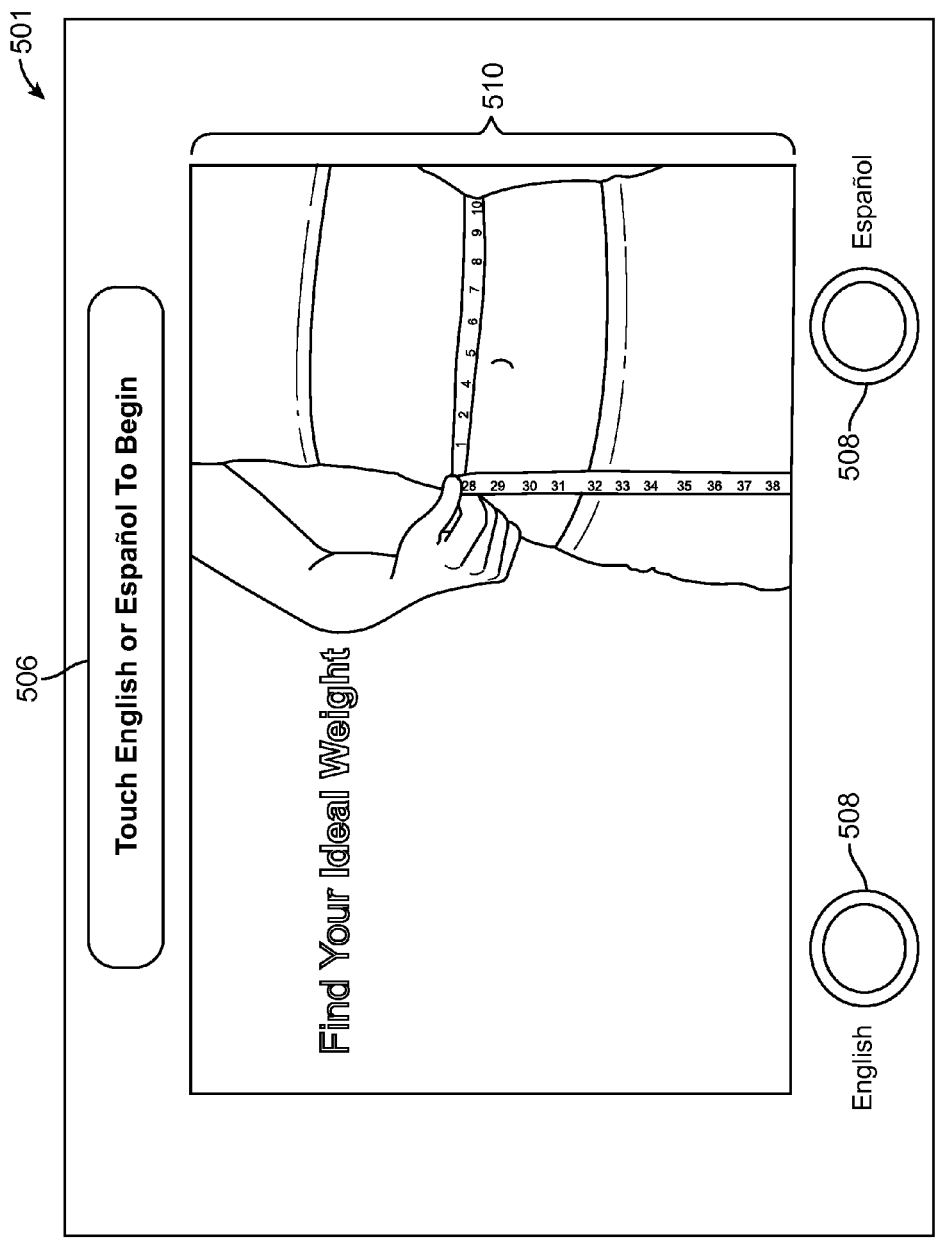
FIG. 5B illustrates an alternative screen image generated by the graphical user interface (GUI) of the electronic weighing system for display on the touch-screen LCD device, according to an embodiment of the present invention.

FIG. 5B illustrates an alternative screen image 501 generated by the GUI 326 (FIG. 3) of the electronic weighing system 100 for display on the touch-screen LCD device 104 (FIG. 2), according to an embodiment of the present invention. In this image 501, an advertisement 510 invites a user to find his/her ideal body weight. Moreover, advertisements such as advertisements 510 and 504 (FIG. 5A) may rotate and/or cycle through several images to entice the user to utilize the electronic weighing system 100 (FIG. 2).

Figure 5C:
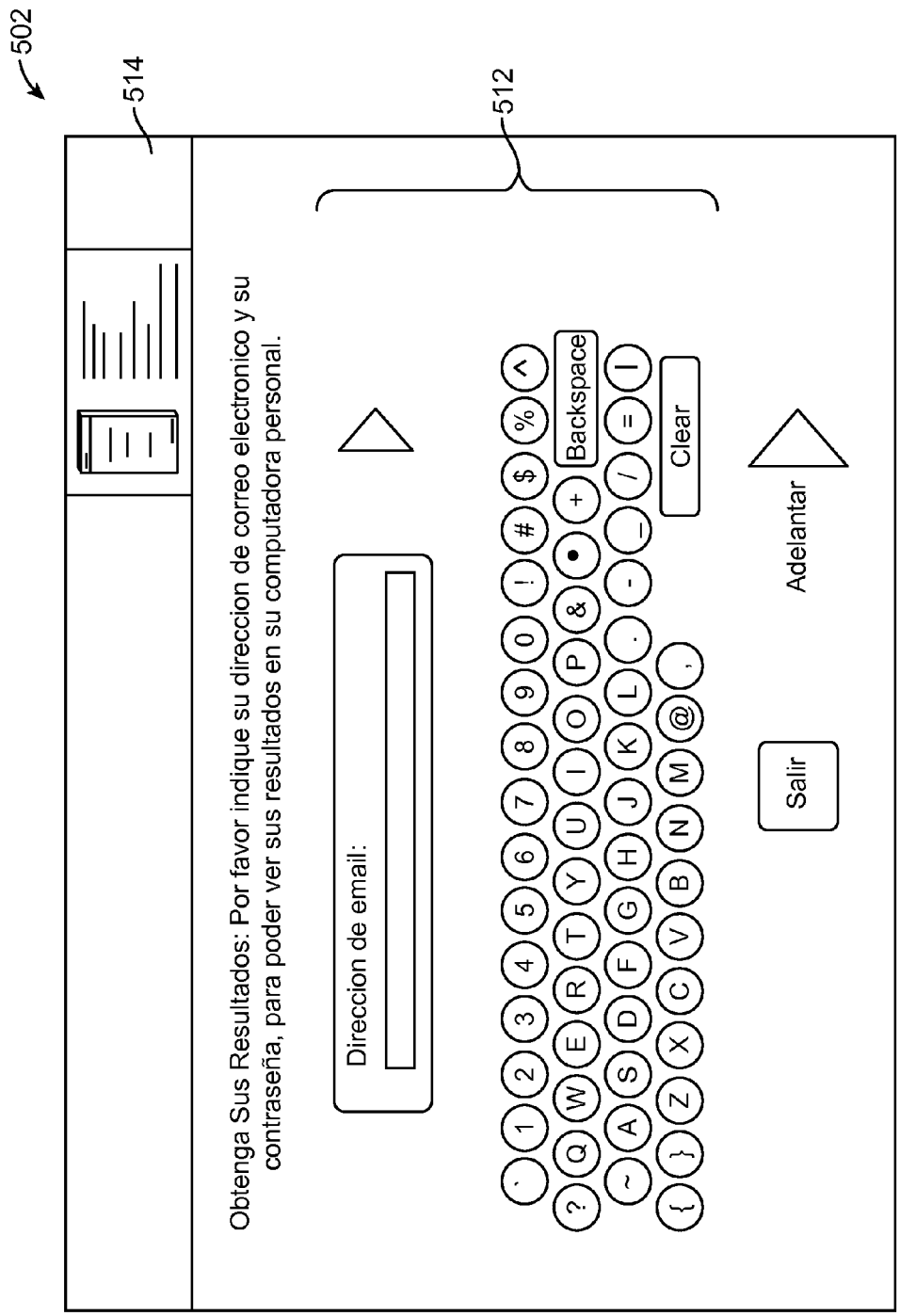
FIG. 5C illustrates an alternative screen image generated by the graphical user interface (GUI) of the electronic weighing system for display on the touch-screen LCD device, according to an embodiment of the present invention.

FIG. 5C illustrates an alternative screen image 502 generated by the GUI 326 (FIG. 3) of the electronic weighing system 100 for display on the touch-screen LCD device 104 (FIG. 2), according to an embodiment of the present invention. As shown, the screen image 502 comprises an on-screen keyboard 512, and an advertisement 514 spanning a portion of the image 502. The on-screen keyboard 512 is provided to allow a user to input his/her personal information (e.g., height, age, sex, email address, etc.). Instead of, or in addition to, an on-screen keyboard 512, the electronic weighing system 100 (FIG. 2) may include a physical keyboard (not shown) such as a keypad for data entry.

Figure 5D:
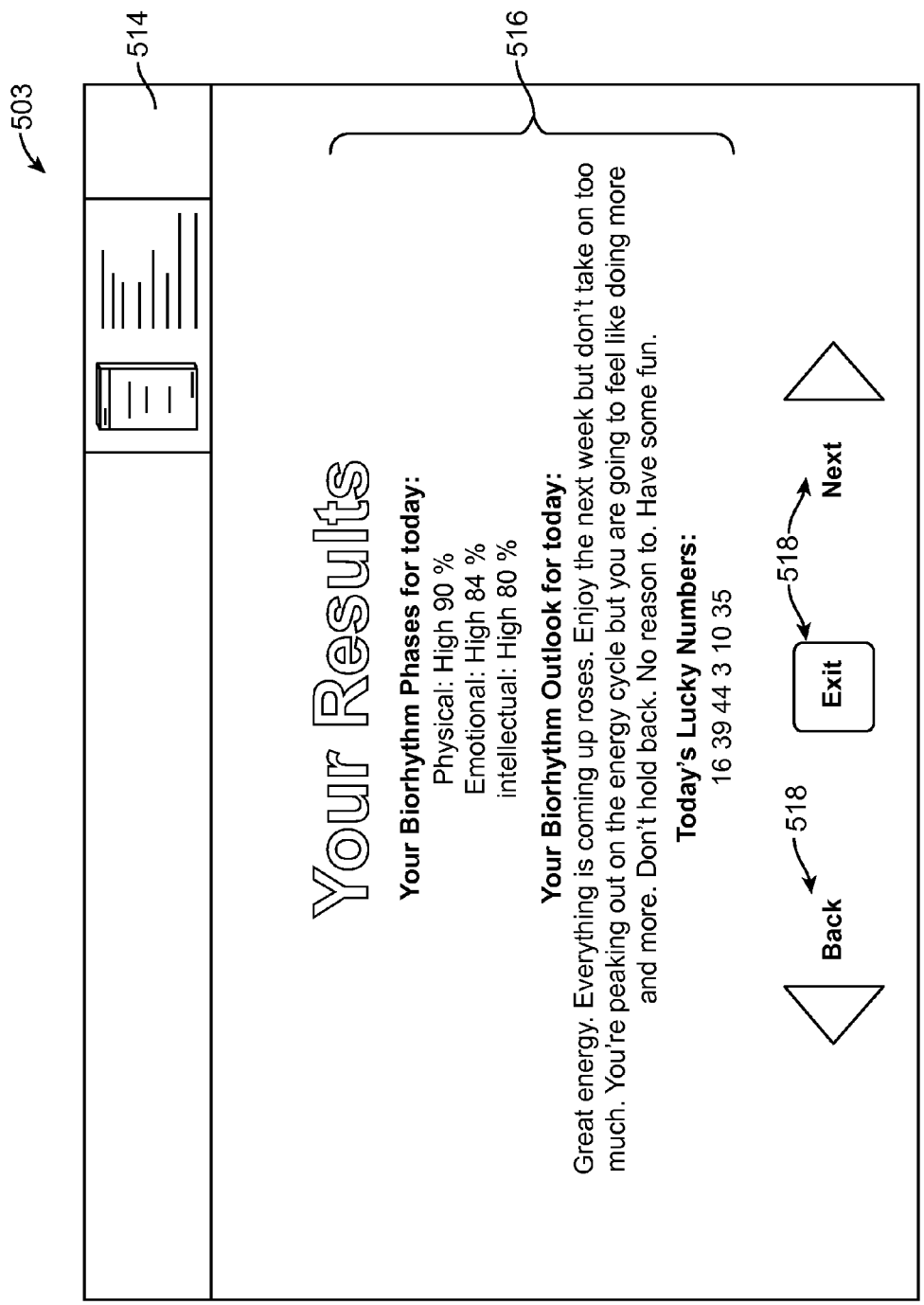
FIG. 5D illustrates an alternative screen image generated by the graphical user interface (GUI) of the electronic weighing system for display on the touch-screen LCD device, according to an embodiment of the present invention.

FIG. 5D illustrates an alternative screen image 503 generated by the GUI 326 (FIG. 3) of the electronic weighing system 100 for display on the touch-screen LCD device 104 (FIG. 2), according to an embodiment of the present invention. FIG. 5D illustrates a screen image 503 comprising output data 516, an advertisement 514, and input controls 518 for the user. The output data 516 in this example includes customized information for a user, such as biorhythm data values. The advertisement 514 spans only a portion of the image 503. The input controls 518 present operation options to the user, such as moving to a next screen or a prior screen, selecting certain information, etc. In the example screen image 503, the input controls 518 identify that the user may discontinue using the electronic weighing system, return to a previous image, or continue to the next screen image.

According to embodiments of the present invention, the information displayed by the GUI 326, and interactions with the user via the GUI 326 (such as receiving input data, control commands, etc.), are provided by the user interface module 308 which is controlled by the processing module 302 as configured by the application module 318 (FIG. 3). According to embodiments of the present invention, all operations of the electronic weighing system 100 (FIG. 1) are controlled by the processing module 302 as configured by the application module 318 (FIG. 3).

Figure 6:
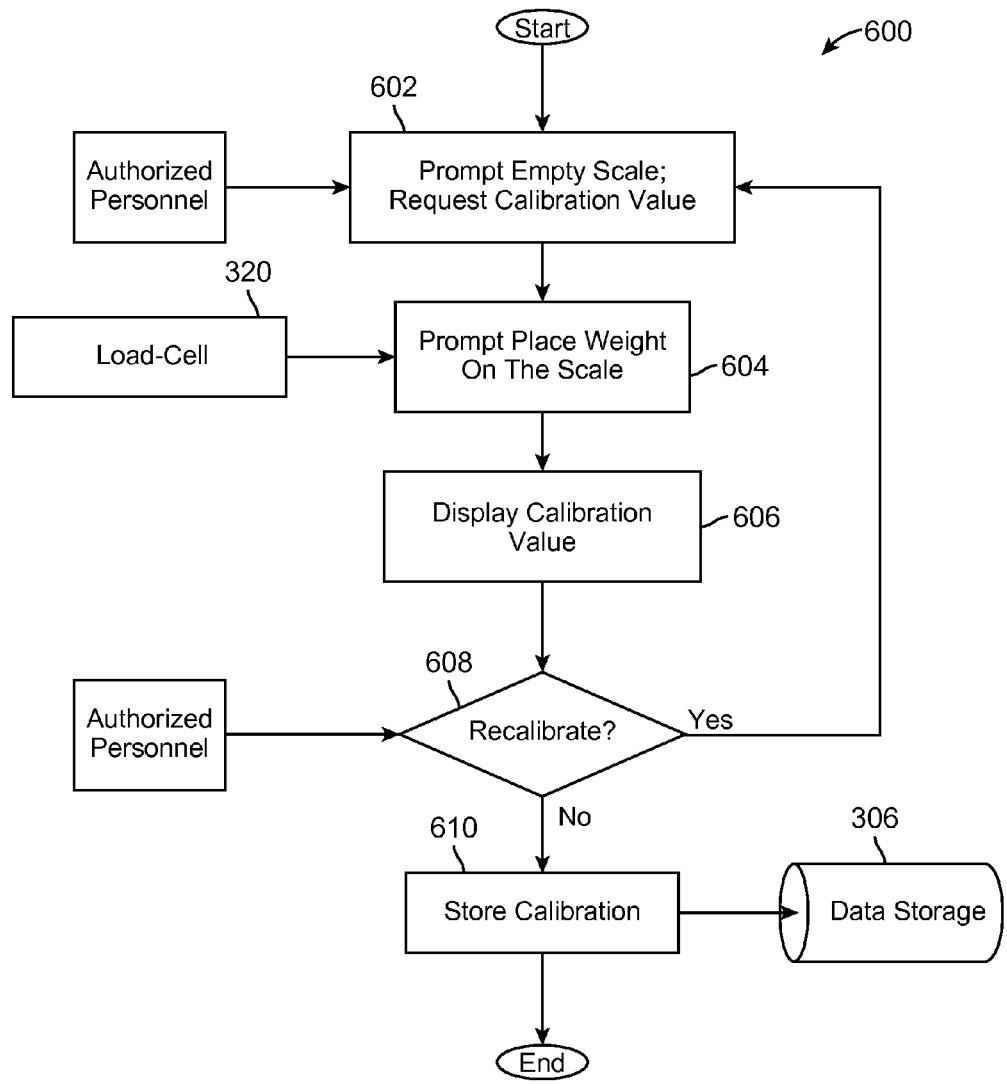
FIG. 6 illustrates a flowchart of process blocks of a process for calibrating a load-cell of the electronic weighing system, according to an embodiment of the present invention.

FIG. 6 illustrates a flowchart of process blocks of a process 600 for calibrating the load-cell 320 (FIG. 3) of the electronic weighing system 100 (FIG. 1), according to an embodiment of the present invention. The process 600 begins with process block 602 by prompting authorized personnel to remove items from the scale platform 110 (FIG. 2). The prompt may be presented to an authorized personnel via the GUI 326 controlled by the user interface module 308 (FIG. 3), and displayed on the touch-screen LCD device 104 (FIG. 2). Process block 602 further requests a calibration value (e.g. 3 lbs, 5 kg, etc.) from the authorized personnel, the calibration value being equal to the weight of an object that will subsequently be placed on the platform 110 to calibrate the load-cell module 320 (FIG. 3). In order to calibrate the load-cell module 320 (FIG. 3) properly, the weight of the object should be known beforehand. In one embodiment, the authorized personnel provides the calibration value using an on-screen keyboard 512 (FIG. 5C), while in other embodiments the value may be entered using a physical keyboard attached to the electronic weighing system 100 (FIG. 2). Process block 602 is complete once the calibration value is provided.

Process block 604 prompts the authorized personnel to place the object used to calibrate the load-cell module 320 on the scale platform 110 (FIG. 2). Process block 604 is complete when the load-cell 320 detects pressure (due to the object being placed thereupon) and sends information to the processing module 302 (FIG. 3).

Process block 606 displays both the weight entered by the authorized personnel and the weight calculated by the load-cell module 322 (FIG. 3) on the touch-screen LCD device 104 (FIG. 2). In one embodiment, the authorized personnel may fine tune the displayed calibration settings using input controls 518 (FIG. 5D). Process block 606 is complete after displaying the calibration values via the GUI 326 (FIG. 3) on the touch-screen LCD device 104 (FIG. 2).

Process block 608 prompts the authorized personnel with two options: recalibrate the load-cell module 320 (FIG. 2) or end the calibration session. The authorized personnel may select recalibration to ensure the load-cell module 320 is properly calibrated by testing the scale platform 110 (FIG. 2) with another object of known weight. If the authorized personnel chooses to recalibrate the load-cell module 320, process block 602 begins prompting the removal of items from the scale platform 110 (FIG. 2).

However, if the authorized personnel is satisfied with the calibration results from process block 606, the authorized personnel may choose to end the calibration session. In this instance process block 608 is complete and process block 610 stores the calibration information to the data storage module 306 (FIG. 3). After storing the calibration information to the data storage module 306 (FIG. 3), the process 600 ends. In one embodiment of the invention, the process 600 is implemented by the processing module 308 as configured by the application module 318 (FIG. 3).

Figure 7:
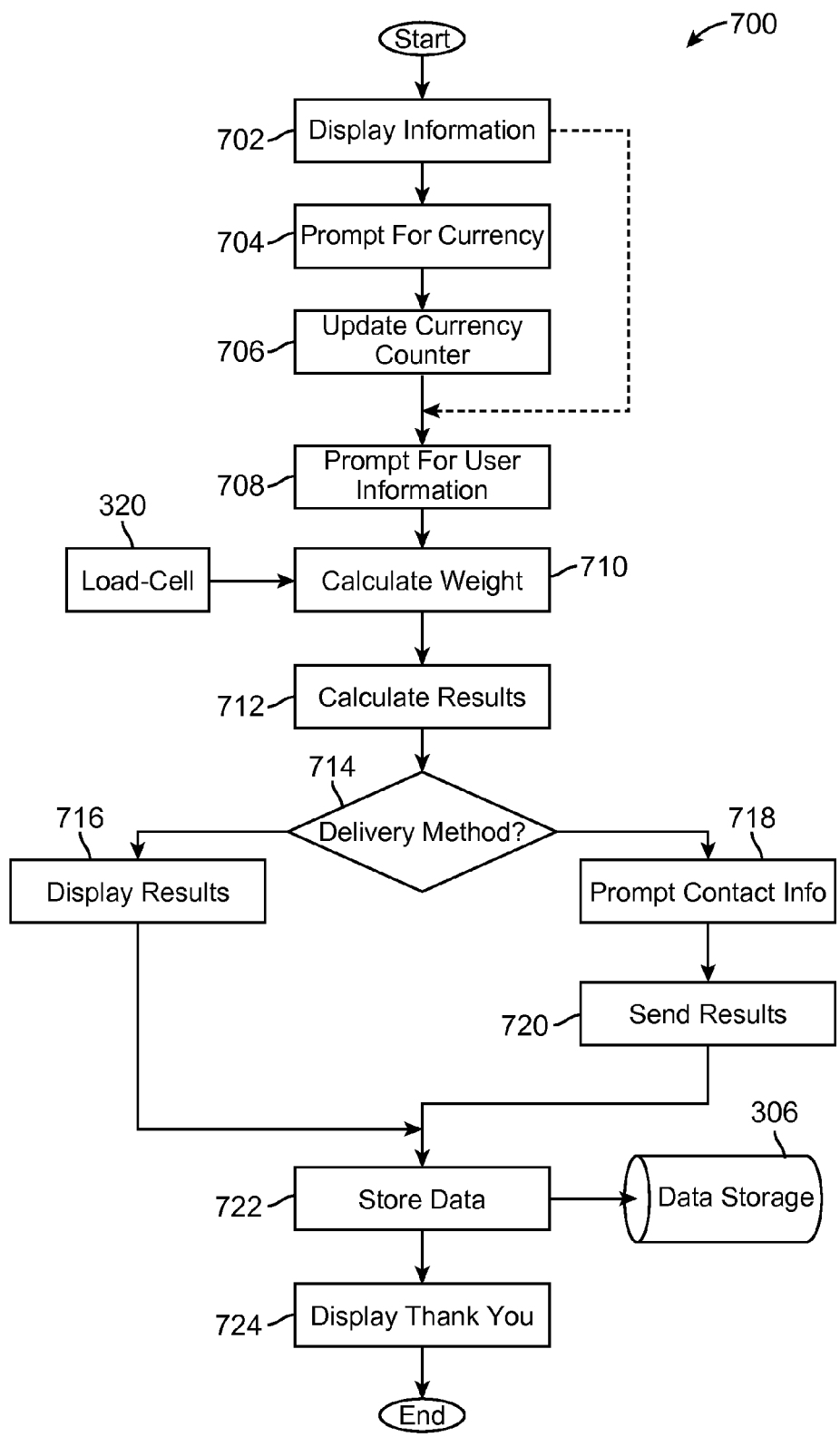
FIG. 7 illustrates a flowchart of process blocks of a process for electronically weighing a user, according to an embodiment of the present invention.

FIG. 7 illustrates a flowchart of process blocks of a process 700 for electronically weighing a user, according to an embodiment of the present invention. The process 700 begins with process block 702 which displays information to potential users, as discussed above. Process block 702 presents animations and/or animated advertisements 504 (FIG. 5A) to potential users via the GUI 326 (FIG. 3) on the touch-screen LCD device 104 (FIG. 2). Process block 702 is complete when a user selects his/her desired language 508 (FIG. 5B).

In one embodiment of the invention, the electronic weighing system 100 (FIG. 2) is not currency-based wherein when process block 702 is completed process block 708 (exemplified by the dashed line in FIG. 7) is initiated. In another embodiment of the invention, the electronic weighing system 100 is currency-based as represented by process blocks 704-706. Process block 704 comprises prompting the user for currency payment for using the electronic weighing system 100 (FIG. 1). Payment may be provided by, for example, currency (e.g., banknotes or coins), ATM charge card, credit card, wire transfer, electronic fund transfer (EFT), internet money transfer, etc. If the user provides the requisite currency, process block 704 signals the currency module 324 (FIG. 3) to reflect the same.

Alternatively, payment may be provided in the form of a charge assessed to the user personal electronic device 408 (e.g. cellular telephone; FIG. 4). In this scenario, the user may send a text message with a specific set of characters to a telephone number presented on the touch-screen LCD device 104 (FIG. 2). After receiving payment from the user, process block 704 is complete, the currency module 324 (FIG. 3) is updated by process block 706, and process block 708 begins gathering user personal information.

Specifically, process block 708 prompts the user for personal information including, for example, gender, height, date of birth (DOB), build type (e.g., small, medium, large), and user activity level (e.g., inert, slow, active). In one embodiment, the user provides his/her information utilizing an on-screen keyboard 512 (FIG. 5C) displayed on the touch-screen LCD device 104 (FIG. 2). In an alternative embodiment of the present invention, the user uses a physical keyboard attached to the frame 106 of the electronic weighing system 100 to input information (FIG. 2). Process block 708 is complete after receiving all of the user personal information.

Process block 710 calculates the user weight using the load-cell module 320 in the scale platform 110 (FIG. 2). The user, by standing on the scale platform 110, exerts a force upon the scale platform 110 which in turn exerts a force upon the load-cell module 320 (FIG. 2) residing therein. The load-cell module 320 converts the force into a measurable electrical output and sends the output to the electronics module 300 (FIG. 3) for processing. The processing module 302 (FIG. 3) converts the electrical output into a value (weight) easily understood by the user (e.g., pounds, kilograms, etc.). Process block 710 is complete after calculating the user weight.

Based on the user input data and calculated weight, process block 712 calculates the user Body Mass Index (BMI) value. In one embodiment of the present invention, process block 712 further calculates the user ideal weight using a formula (e.g., formula based on Build Study, 1979, compiled by the Society of Actuaries and Association of Life Insurance Medical Directors of http://www.bcbst.com/mpmanual/!SSL!/WebHelp/HW.htm). Moreover, process block 712 calculates the user suggested caloric intake utilizing the same formulae. Finally, process block 712 calculates the user biorhythm cycle values based on his/her date of birth (DOB) provided in process block 708. Process block 712 concludes after calculating the user results. Examples of the above-mentioned calculations/formulas are provided in Table 1, further below. Other calculations/formulas may also be utilized.

Process block 714 prompts the user via the GUI 326 (FIG. 3) on the touch-screen LCD device 104 (FIG. 2) about how the user would like to receive his/her personalized results. One option is to display the user personalized results (customized results) immediately on the touch-screen LCD device 104 (FIG. 2) via the GUI 326 (FIG. 3). Another option is to send the user personalized results to a user personal electronic device 408 (e.g., by electronic mail, cellular telephone) for later viewing (FIG. 4).

If the user chooses to immediately receive his/her personalized results, process block 716 displays the user results (personalized results) via the GUI 326 (FIG. 3) on the touch-screen LCD device 104 (FIG. 2). In one embodiment, user results are displayed in a single image on the touch-screen LCD device 104. In an alternative embodiment, each user result is displayed alone and the user may view each user result before continuing to the next result using input controls 518 (FIG. 5D). Process block 716 is complete after displaying the user results.

If the user chose to have his/her personalized results sent to a personal electronic device 408 (FIG. 4), process block 718 prompts the user for contact information including: electronic mail (email) address, telephone number, and mailing address. In one embodiment, the user provides his/her contact information utilizing an on-screen keyboard 512 (FIG. 5C) displayed via the GUI 326 (FIG. 3) on the touch-screen LCD 104 (FIG. 2). The user may be prompted to provide one unit of information at a time, or alternatively the user may be prompted to enter all the requested contact information before proceeding. In an alternative embodiment, the user uses a physical keyboard attached to the electronic weighing system 100 to input his/her contact information. Process block 718 is complete after receiving the user contact information.

In one embodiment, process block 720 delivers the user results to the provided email address via an SMTP server 406 (FIG. 4). In another embodiment, the electronic weighting system 100 provides the user personalized information to the user in multiple ways, including by displaying on the GUI 326 (FIG. 3), by email, by text message, etc., as may be desired by the user.

In one embodiment of the present invention, for each user of the weighing scale 100, the process block 722 stores the user personal and contact information along with the user results in the data storage module 306 (FIG. 3) residing in the electronics module 300 (FIG. 3) of the electronic weighing system 100 (FIG. 1). Additionally, process block 722 may store data pertaining to the electronic weighing system 100 including, for example, date of use, time of use, duration of user experience, number of advertisements displayed to the user, etc. Alternatively, process block 722 may store the available user personal information, contact information, user personalized results, and system data in a remote server(s) 404 connected to the electronic weighing system 100 through the Internet 402 (FIG. 4).

Process block 724 presents an informational message, such as a greeting message, to the user via the GUI 326 (FIG. 3) and displayed on the touch-screen LCD device 104 (FIG. 2). The thank you message is designed to inform the user that the electronic weighing system 100 has finished providing service thereto. After thanking the user, process block 724 is complete and the process 700 ends. Alternatively, after completion of process block 724, the process 700 returns to process block 702 and presents animations and/or animated advertisements 504 (FIG. 5B) to entice additional users. In one embodiment of the invention, the process 700 is implemented by the processing module 308 as configured by the application module 318 (FIG. 3).

In another embodiment of the invention, the electronic weighing system 100 (FIG. 1) allows the user to utilize a personal electronic device 408 (FIG. 4), such as smart phone, to establish a direct wireless connection (e.g., Bluetooth, IEEE 802.11 wireless connection, etc.) with the electronic weighing system 100 for interacting with the electronic weighing system 100, including receiving the user personalized results. In another embodiment, the electronic weighing system 100 (FIG. 1) allows the user to utilize a personal electronic device 408 (FIG. 4), such as smart phone, to establish a direct wired connection (e.g., via a USB cable).

Figure 8:
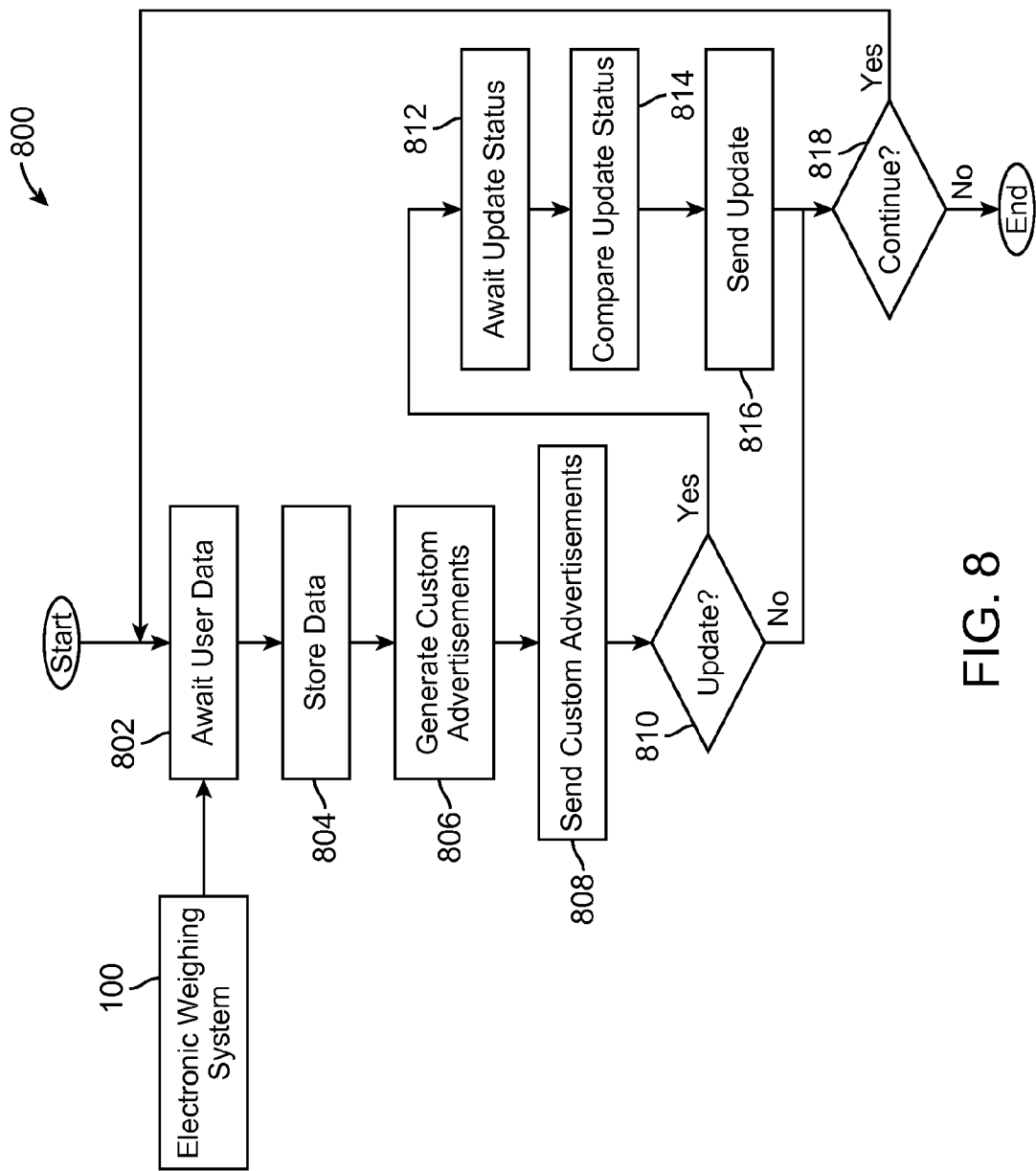
FIG. 8 illustrates a flowchart of process blocks of a process for managing the electronic weighing system, according to an embodiment of the present invention.

FIG. 8 illustrates a flowchart of process blocks of a process 800 for interaction between a remote server 404 and one or more electronic weighing systems 100 via a communication link, according to an embodiment of the present invention. In one embodiment of the invention, the process 800 may be performed by a controller module 404C in a remote server 404 (FIG. 4) in conjunction with an electronic weighing system 100 (FIG. 40).

In one embodiment of the invention, prior to process block 802, a remote server 404 (FIG. 4) requests information such as user data (e.g., personal information, contact information, calculated user results, etc.) from a weighing systems 100. In one embodiment, a remote server 404 requests such information from a plurality of electronic weighing systems 100 (FIG. 4).

Such a request may be sent after a specific period of time (e.g., 1 hour, day, week, month, etc.) and/or the electronic weighing system 100 may submit the user data automatically after a specific period of time, after a specific number of transactions, or after a specific number of advertisements have been displayed. Moreover, the electronic weighing system 100 may submit user data immediately upon receiving the same from a user. Process block 802 is complete after receiving user data.

According to process block 804, storing the received user data may occur locally in a storage module within the remote server 404 (FIG. 4) and/or in a data base 404D. The remote server may store the user data in a network attached storage (NAS), storage area network (SAN), or a third-party hosted storage facility.

After process block 804 concludes, in an advertisement-based version of a weighing system 100, process block 806 generates customized advertisements based on the stored user data. In process block 806, custom advertisements may be generated with particular care to, for example, user sex, age, weight, body shape, and/or physical activity level. Further, customized advertisements may take into account the electronic weighing system 100 location, date, time, etc. Further, customized advertisements may take into account details from a plurality of user data and/or data from a plurality of electronic weighing systems 100.

In an alternative embodiment of the present invention, customized advertisements are generated by an electronic weighing system 100 itself and, as such, process blocks 806 and 808 are optional. Process block 808 is complete after sending the custom advertisements to the electronic weighing system 100 (e.g., via the Internet 402 FIG. 4).

Process block 810 determines whether the application module 318 (FIG. 3) in an electronics module 300 (FIG. 3) of an electronic weighing system 100 requires updating. This decision may take into account the period of time since a previous update (e.g., weeks, months, etc.). The decision may also take into account whether a new update was provided to the remote server(s) 404 (FIG. 4). Furthermore, authorized personnel may determine the need for an update.

If a decision is made to update an electronic weighing system 100, process block 812 begins waiting for a last update status from the electronic weighing system 100. However if the decision is made to forego updating the electronic weighing system 100, process block 818 determines whether to wait for additional user data or to end.

In one embodiment of the present invention, a request for update status is made to the electronic weighing system 100 prior to process block 812. The requests may be sent after a specific period of time (e.g., 1 hour, day, week, month, etc.); after a decision to update is made pursuant to process block 818, or alternatively the electronic weighing system 100 may submit its update status after a specific period of time, number of transactions, etc. Process block 812 is complete after receiving the update status from the electronic weighing system 100.

Process block 814 compares the latest update status received from the electronic weighing system 100 with the latest update residing on the remote server(s) 404 (FIG. 4). In one example, where the electronic weighing system 100 update status matches the update on the remote server, then the application module 318 in the electronics module 300 (FIG. 3) residing on the electronic weighing system 100 is current and process block 814 ends. However, if the electronic weighing system 100 update status fails to match the update status on the remote server(s) 404 (FIG. 4), process block 816 updates the on the electronic weighing system 100.

According to process block 816, in one embodiment of the present invention, the application module 318 in the electronics module 300 (FIG. 3) residing on the electronic weighing system 100 is immediately updated by the remote server(s) 404 (FIG. 4). Alternatively, the remote server 404 may update the application module 318 in the electronics module 300 (FIG. 3) residing on the electronic weighing system 100 at a predetermined time (e.g., after business hours), or a specific day of the week (e.g., Sunday). Process block 816 is complete after the update is transmitted through the Internet 402 (FIG. 4) to the electronic weighing system 100.

Process block 818 determines whether to wait for subsequent user data, or to end the process 800. The decision may take into account the current time and likelihood of receiving additional user data (e.g., time of day, day of week, data received over a recent period of time, etc.). In one embodiment process block 818 always returns to process block 802 and awaits further user data.

In another embodiment of the invention, a remoter server 404 transmits the personalized user data generated by, and received from, a weighing system 100 to destinations indicated by the user. Examples of such destinations include email address of the user, a personal device of the user, text message address of the user, etc. In this embodiment, the weighing system 100 need not (but may) transmit the personalized user data to the user and may simply display the personalized user data in the GUI 326 on the display 104.

Figure 9:
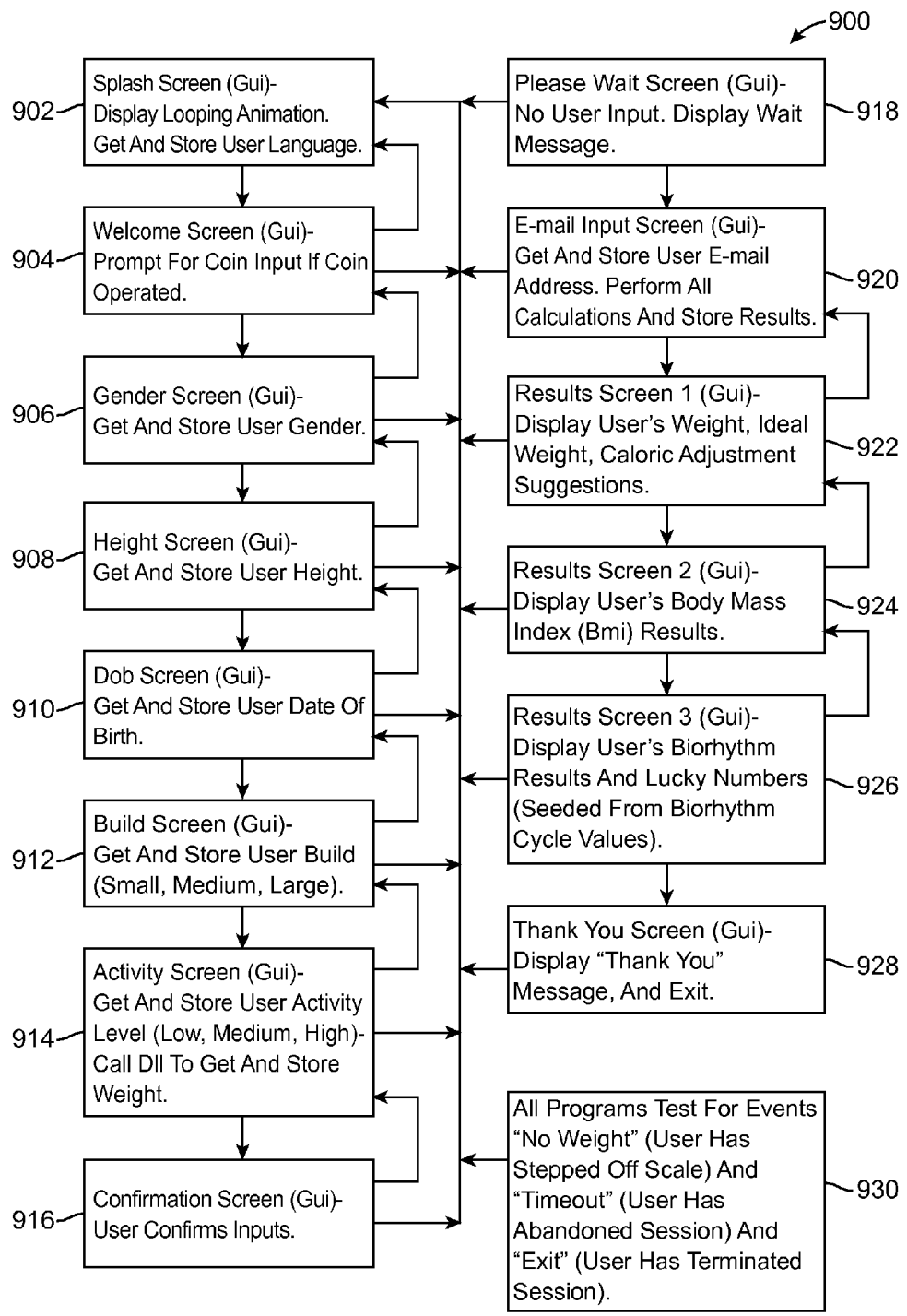
FIG. 9 illustrates a flowchart of process blocks of an alternative process for electronically weighing a user, according to an embodiment of the present invention.

FIG. 9 illustrates a flowchart of process blocks of a process 900 for electronically weighing a user, according to another embodiment of the present invention. The process 900 illustrates operational scenarios for a weighting system 100. In one implementation, process block 902 comprises displaying multimedia information such as looping animation on the touch-screen LCD device 104 (FIG. 1) using the GUI 326 (FIG. 3).

Example animations displayed on the touch-screen LCD device 104 (FIG. 1) using the GUI 326 (FIG. 3) according to process block 902 are illustrated in FIGS. 5A-5B. The animation according to process block 902 may comprise the language options 508 (FIG. 5A) which provides a list of languages the electronic weighing system 100 (FIG. 2) can display. Process block 902 receives a language selected by the user from the list of languages displayed in the language option 508 (FIG. 5B). Process block 902 further stores the user selected language, for example, in the data storage module 306 (FIG. 3).

Process block 904 comprises displaying a welcome screen on the touch-screen LCD device 104 (FIG. 1) using the GUI 326 (FIG. 3). Process block 904 further prompts the user for currency payment for using the electronic weighing system 100 (FIG. 1). In an alternative embodiment of the invention where the electronic weighing system 100 (FIG. 2) is not currency-based, process block 904 is optional.

Process block 906 comprises displaying a gender screen on the touch-screen LCD device 104 (FIG. 1) using the GUI 326 (FIG. 3). Process block 906 prompts a user to select his/her gender from the displayed options: male or female. Alternatively, process block 906 may prompt a user to enter his/her gender, for example, by typing the letter "M" for male or the letter "F" for female utilizing an on-screen keyboard 512 (FIG. 5C). Process block 906 stores the gender information received from a user, for example, in the data storage module 306 (FIG. 3) of the electronics module 300 residing in the electronic weighing system 100 (FIG. 1). Alternatively, process block 906 stores the user gender information in a remote server 404 via a connection to the Internet 402 (FIG. 4).

Process block 908 comprises displaying a height screen on the touch-screen LCD device 104 (FIG. 1) using the GUI 326 (FIG. 3). In one embodiment, process block 908 displays a plurality of heights (e.g., 55 inches, 56 inches, 5 ft and 1 inch, 5 ft and 2 inches, etc.) and prompts a user to select the value matching his/her height. Alternatively, process block 908 may display a drop-down list and prompt a user to select a value matching his/her height. In another embodiment, process block 908 prompts a user to enter his/her height, for example, utilizing an on-screen keyboard 512 (FIG. 5C). Process block 908 stores the height information received from the user, for example, in the data storage module 306 (FIG. 3) of the electronics module 300 residing in the electronic weighing system 100 (FIG. 1). Alternatively, process block 908 stores the user height information in a remote server 404 via a connection to the Internet 402 (FIG. 4).

Process block 910 comprises displaying a date of birth (DOB) screen on the touch-screen LCD device 104 (FIG. 1) using the GUI 326 (FIG. 3). In one embodiment, process block 910 prompts a user to select from drop-down lists the month, day, and year he/she was born. Alternatively, process block 910 may prompt a user to enter his/her date of birth (e.g., mm/dd/yy, dd/mm/yyyy, yyyy/mm/dd, etc.) using, for example, the on-screen keyboard 512 (FIG. 5C). Process block 910 receives the date of birth for a user and stores the same, for example, in the data storage module 306 (FIG. 3) of the electronics module 300 residing in the electronic weighing system 100 (FIG. 1). Alternatively, process block 910 stores the user date of birth information in a remote server 404 via a connection to the Internet 402 (FIG. 4).

Process block 912 comprises displaying a body shape screen on the touch-screen LCD device 104 (FIG. 1) using the GUI 326 (FIG. 3). In one embodiment, process block 912 prompts a user to select, from a drop-down list, a body shape that best describes the user (e.g., small, medium, large, thing, stocky, athletic, etc.). Process block 912 stores the body shape information received from the user, for example, in the data storage module 306 (FIG. 3) of the electronics module 300 residing in the electronic weighing system 100 (FIG. 1). Alternatively, process block 912 stores the user body shape information in a remote server 404 via a connection to the Internet 402 (FIG. 4).

Process block 914 comprises displaying an activity screen on the touch-screen LCD device 104 (FIG. 1) using the GUI 326 (FIG. 3). In one embodiment, process block 914 prompts a user to select, from a drop-down list, and activity level that best describes the user (e.g., low, medium, high, etc.). Process block 914 stores the user activity level information, for example, in the data storage module 306 (FIG. 3) of the electronics module 300 residing in the electronic weighing system 100 (FIG. 1). Alternatively, process block 914 stores the user activity level information in a remote server 404 via a connection to the Internet 402 (FIG. 4).

Process block 914 further comprises calculating the user weight using the load-cell module 320 in the scale platform 110 (FIG. 2). The user, by standing on the scale platform 110, exerts a force upon the scale platform 110 which in turn exerts a force upon the load-cell module 320 (FIG. 2) residing therein. The load-cell module 320 (FIG. 1) converts the force into a measurable electrical output (e.g., user weight). Process block 914 obtains the user weight from the load-cell module 320 and stores the same, for example, in the data storage module 306 (FIG. 3) of the electronics module 300 residing in the electronic weighing system 100 (FIG. 1). Alternatively, process block 914 stores the user weight in a remote server 404 via a connection to the Internet 402 (FIG. 4).

Process block 916 comprises displaying a confirmation screen on the touch-screen LCD device 104 (FIG. 1) using the GUI 326 (FIG. 3). In one embodiment, process block 916 displays all information received and/or obtained from a user (process blocks 906-914) and prompts the user to confirm the information is accurate. In one embodiment, the user may utilize an on-screen keyboard 512 (FIG. 5C) or input controls 518 (FIG. 5D) to confirm or deny the accuracy of the displayed information.

Process block 918 comprises displaying a wait message on the touch-screen LCD device 104 (FIG. 1) using the GUI 326 (FIG. 3). In one embodiment of the invention, process block 918 displays the wait message after a user confirms his/her inputted personal information (process block 916) and before displaying user personal results (process blocks 922-926).

Process block 920 comprises displaying an electronic mail (email) screen on the touch-screen LCD device 104 (FIG. 1) using the GUI 326 (FIG. 3). In one embodiment, process block 920 prompts a user to enter his/her electronic mail (email) address utilizing an on-screen keyboard 512 (FIG. 5C). Alternatively, a user may enter his/her electronic mail (email) address using a physical keyboard attached to the L-shaped frame 106 of the electronic weighing system 100 (FIG. 1). Process block 920 stores the user electronic mail (email) address, for example, in the data storage module 306 (FIG. 3) of the electronics module 300 residing in the electronic weighing system 100 (FIG. 1). Alternatively, process block 920 stores the user electronic mail (email) address in a remote server 404 via a connection to the Internet 402 (FIG. 4).

Process block 920 further comprises calculating user personalized results including the user Body Mass Index (BMI) value; the user ideal weight using a formula derived from the Society of Actuaries and Association of Life Insurance Medical Directors of America Build Study; the user suggested caloric intake; and the user biorhythm cycle values based on his/her date of birth (DOB). Process block stores the user personalized results, for example, in the data storage module 306 (FIG. 3) of the electronics module 300 residing in the electronic weighing system 100 (FIG. 1). Alternatively, process block 920 stores the user personalized results in a remote server 404 via a connection to the Internet 402 (FIG. 4).

Process block 922 comprises displaying a first results screen on the touch-screen LCD device 104 (FIG. 1) using the GUI 326 (FIG. 3). The first results screen comprises weight of a user calculated in process block 914 and both the user ideal weight and suggested caloric intake calculated in process block 920. Process block 922 may display the first results screen for a predetermined period of time (e.g., 30 seconds, 1 minute, etc.). Alternatively, process block 922 may display the first results screen until a user selects otherwise using input controls 518 (FIG. 5D) displayed by the GUI 326 (FIG. 3).

Process block 924 comprises displaying a second results screen on the touch-screen LCD device 104 (FIG. 1) using the GUI 326 (FIG. 3). The second results screen comprises a Body Mass Index (BMI) of a user as calculated in process block 920. Process block 924 may display the second results screen for a predetermined period of time (e.g., 30 seconds, 1 minute, etc.). Alternatively, process block 924 may display the second results screen until a user selects otherwise using input controls 518 (FIG. 5D) displayed by the GUI 326 (FIG. 3).

Process block 926 comprises displaying a third results screen on the touch-screen LCD device 104 (FIG. 1) using the GUI 326 (FIG. 3). The third results screen comprises user biorhythm cycle values calculated in process block 920 as well as user lucky numbers derived from the user biorhythm cycle values. Process block 926 may display the third results screen for a predetermined period of time (e.g., 30 seconds, 1 minute, etc.). Alternatively, process block 926 may display the third results screen until a user selects otherwise using input controls 518 (FIG. 5D) displayed by the GUI 326 (FIG. 3).

Process block 928 comprises displaying a thank you screen on the touch-screen LCD device 104 (FIG. 1) using the GUI 326 (FIG. 3). The thank you screen is designed to inform the user that the electronic weighing system 100 (FIG. 1) has finished providing service thereto. Process block 928 may display the thank you screen for a predetermined period of time (e.g., 30 seconds, 1 minute, etc.). Alternatively, process block 928 may display the thank you screen until a user selects otherwise using input controls 518 (FIG. 5D) displayed by the GUI 326 (FIG. 3).

Process block 930 comprises testing for events indicating a user no longer wishes to receive personalized results from the electronic weighing system 100 (FIG. 1). In one embodiment, process block 930 periodically (e.g., every 15 seconds, 30 seconds, etc.) requests user weight from the load-cell module 320 residing in the scale platform 110 of the electronic weighing system 100 (FIG. 1). If the load-cell module 320 returns a user weight below a minimum threshold, process block 930 may conclude that a user stepped off the scale platform 110 (FIG. 1). In one embodiment, the minimum threshold user weigh may be set and/or modified by authorized personnel.

Process block 930 further calculates an elapsed time since receiving information and/or a command from a user (using an on-screen keyboard 512, FIG. 5C). If the elapsed time exceeds a maximum threshold, process block 930 may conclude that a user abandoned his/her request for personalized results. In one embodiment, the maximum threshold of elapsed time may be set and/or modified by authorized personnel.

Process block 930 further detects whether a user terminates his/her request for personalized results. In one embodiment of the invention, a user may terminate his/her request for personalized results by pressing a specific button on the on-screen keyboard 512 (FIG. 5C) displayed on the touch-screen LCD device 104 (FIG. 1) using the GUI 326 (FIG. 3). Alternatively, a user may terminate his/her request by pressing a specific input control 518 (FIG. 5D) displayed on the touch-screen LCD device 104 (FIG. 1) using the GUI 326 (FIG. 3). Upon detecting that a user terminated his/her request for personalized results, process 900 may end or loop back for a next user.

In one embodiment, the electronic weighing system 100 (FIG. 1) may reside in high foot-trafficked locations such as retail shopping centers, health club facilities, grocery stores, etc. The electronic weighing system 100 is modular by design with no permanent installation requirements.

Figure 10:
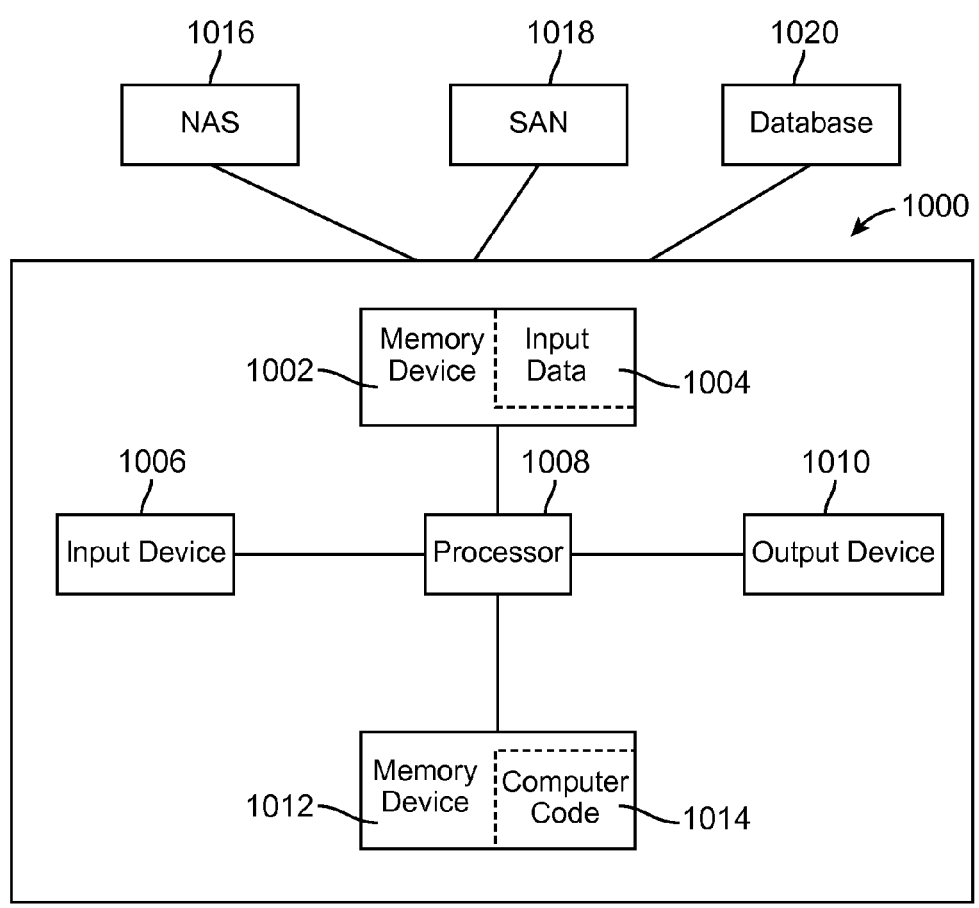
FIG. 10 illustrates a computer system which may perform the processes of calibrating the load-cell, electronically weighing a user, and managing the electronic weighing system, according to an embodiment of the present invention.

FIG. 10 illustrates a computer system 1000 which may perform the processes 600 calibrating the load-cell (FIG. 6), the process 700 electronically weighing a user (FIG. 7), the process 800 managing the electronic weighing system 100 (FIG. 8), and/or the process 900 for electronically weighing a user (FIG. 9), according to an embodiment of the present invention. The computer system 1000 comprises a processor 1008, an input device 1006 coupled to the processor 1008, an output device 1010 coupled to the processor 1008, and memory devices 1002 and 1012 each coupled to the processor 1008. The input device 1006 may be, for example, a keyboard, a mouse, a keypad, a touch screen, a voice recognition device, a sensor, a network interface card (NIC), a Voice/video over Internet Protocol (VOIP) adapter, a wireless adapter, a telephone adapter, a dedicated circuit adapter, etc. The output device 1010 may be, for example, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

The memory devices 1002 and 1012 may comprise a cache, a dynamic random access memory (DRAM), a read-only memory (ROM), a hard disk, a floppy disk, a magnetic tape, an optical storage such as a compact disc (CD) or a digital video disc (DVD), network attached storage (NAS), storage area network (SAN), etc. The memory device 1012 includes a computer code 1014 which is a computer program that comprises computer-executable instructions. The computer code 1014 includes, for example, an algorithm used for calibrating the load-cell 320 (FIG. 3), electronically weighing a user, and managing the electronic weighing system 100 (FIG. 1) according to the present invention. The processor 1008 executes the computer code 1014. The memory device 1002 includes input data 1004. The input data 1004 includes input required by the computer code 1014. The output device 1010 displays output from the computer code 1014. Either or both memory devices 1002 and 1012 (or one or more additional memory devices not shown in FIG. 10) may be used as a computer usable medium (or a computer readable medium or a program storage device) having a computer readable program embodied therein and/or having other data stored therein, wherein the computer readable program comprises the computer code 1014. Generally, a computer program product (or, alternatively, an article of manufacture) of the computer system 1000 may comprise the computer usable medium (or program storage device).

While FIG. 10 shows the computer system 1000 as a particular configuration of hardware and software, any configuration of hardware and software, as would be known to a person of ordinary skill in the art, may be utilized for the purposes stated supra in conjunction with the particular computer system 1000 of FIG. 10. For example, the memory devices 1002 and 1012 may be portions of a single memory device rather than separate memory devices.

Figure 11:
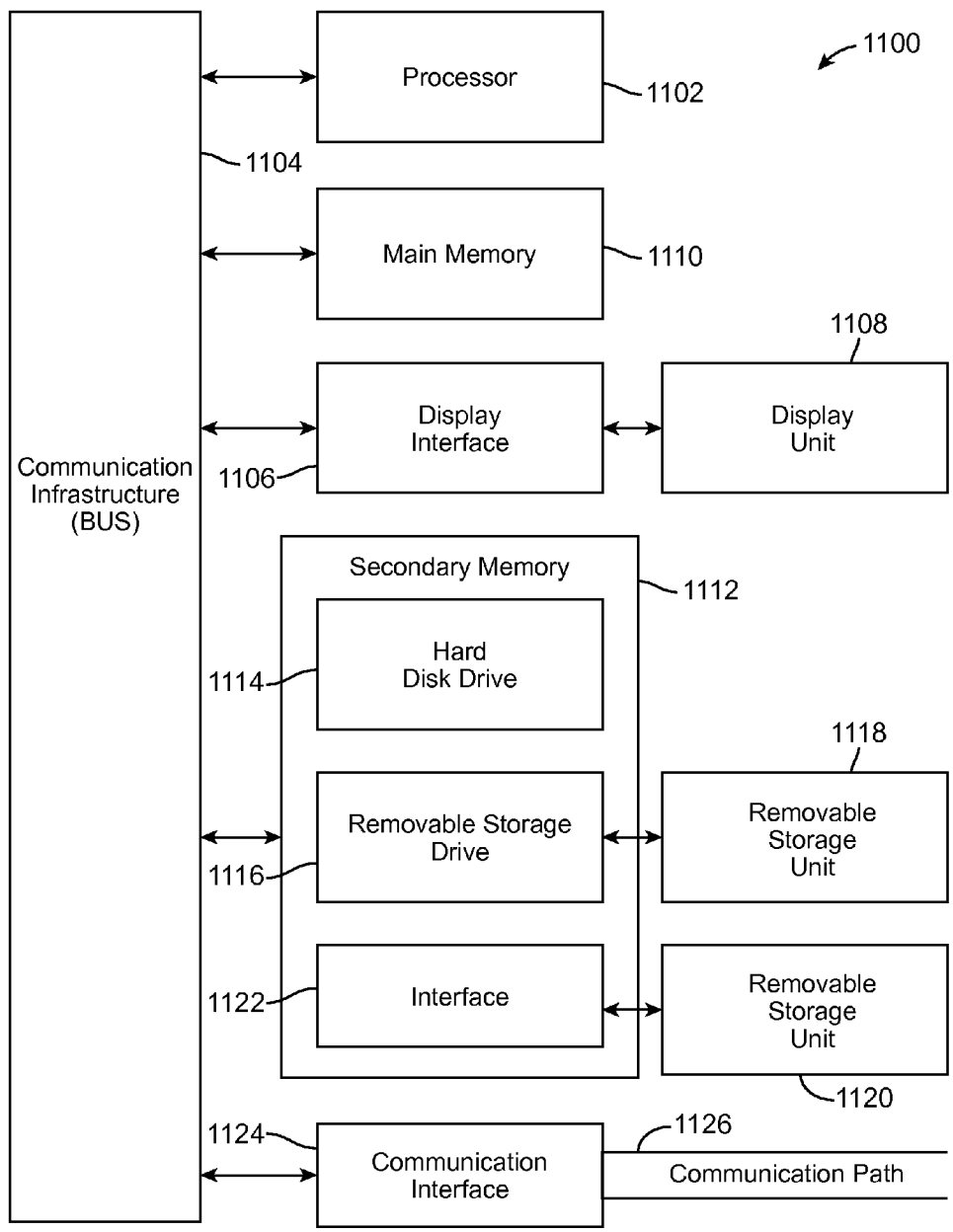
FIG. 11 illustrates a high level block diagram showing an information processing system useful for implementing one embodiment of the present invention.

FIG. 11 illustrates a high level block diagram showing an information processing system 1100 useful for implementing one embodiment of the present invention. The system 1100 includes one or more processors, such as processor 1102. The processor 1102 is connected to a communication infrastructure 1104 (e.g., a communications bus, cross-over bar, or network).

The computer system can include a display interface 1106 that forwards graphics, text, and other data from the communication infrastructure 1104 (or from a frame buffer not shown) for display on a display unit 1108. The computer system also includes a main memory 1110, preferably random access memory (RAM), and may also include a secondary memory 1112. The secondary memory 1112 may include, for example, a hard disk drive 1114 and/or a removable storage drive 1116, representing, for example, a floppy disk drive, a magnetic tape drive, or an optical disk drive. The removable storage drive 1116 reads from and/or writes to a removable storage unit 1118 in a manner well known to those having ordinary skill in the art. Removable storage unit 1118 represents, for example, a floppy disk, a compact disc, a magnetic tape, or an optical disk, etc. which is read by and written to by removable storage drive 1116. As will be appreciated, the removable storage unit 1118 includes a computer readable medium having stored therein computer software and/or data.

In alternative embodiments, the secondary memory 1112 may include other similar means for allowing computer programs or other instructions to be loaded into the computer system. Such means may include, for example, a removable storage unit 1120 and an interface 1122. Examples of such means may include a program package and package interface (such as that found in video game devices), a removable memory chip (such as an EPROM, or PROM) and associated socket, and other removable storage units 1120 and interfaces 1122 which allow software and data to be transferred from the removable storage unit 1120 to the computer system.

The computer system may also include a communications interface 1124. Communications interface 1124 allows software and data to be transferred between the computer system and external devices. Examples of communications interface 1124 may include a modem, a network interface (such as an Ethernet card), a communications port, or a PCMCIA slot and card, etc. Software and data transferred via communications interface 1124 are in the form of signals which may be, for example, electronic, electromagnetic, optical, or other signals capable of being received by communications interface 1124. These signals are provided to communications interface 1124 via a communications path (i.e., channel) 1126. This communications path 1126 carries signals and may be implemented using wire or cable, fiber optics, a phone line, a cellular phone link, a radio frequency (RF) link, and/or other communications channels.

In this document, the terms "computer program medium," "computer usable medium," and "computer readable medium" are used to generally refer to media such as main memory 1110 and secondary memory 1112, removable storage drive 1116, and a hard disk installed in hard disk drive 1114.

Computer programs (also called computer control logic) are stored in main memory 1110 and/or secondary memory 1112. Computer programs may also be received via communications interface 1124. Such computer programs, when run, enable the computer system to perform the features of the present invention as discussed herein. In particular, the computer programs, when run, enable the processor 1102 to perform the features of the computer system. Accordingly, such computer programs represent controllers of the computer system.

Table 1 illustrates pseudo code and formulas that may be utilized to calculate a user suggested weight and caloric intake are as follows:

TABLE 1

```
' ROUTINE TO CALCULATE IDEAL WEIGHT
' Uses ((feet – 4) * 12) + inches for adults and
' Uses (abs(age * 8) / 16) * 16 for child
Dim WTTAB1
Dim WTTAB2
Dim WTTAB3
Dim WTTAB4
Dim CalTab
'Male
WTTAB1 = Array(0, 98, 18, 55, 2, 255, 42, 3)
'FEMALE
WTTAB2 = Array(0, 86, 15, 96, 2, 255, 235, 2)
'MALE CHILD
WTTAB3 = Array(32, 7, 10, 84, 1, 100, 105, 0, 40, 168, 0, 20, 146, 1, 255, 141, 0)
'FEMALE CHILD
WTTAB4 = Array(32, 7, 10, 84, 1, 100, 105, 0, 20, 212, 0, 20, 79, 1, 20, 170, 0, 255, 25, 0)
Dim ptr
If Childflg Then                            'This is a child
    If Maleflg Then                         'this is male child
        CalTab = WTTAB3                         'Load male child table.
    Else                                    'this is female child
        CalTab = WTTAB4                         'Load female child table.
    End If
    Age = Age * 8
    temp0 = Age
    temp0 = temp0 / 256                         'asm program uses only high byte of age
Else                                        'Thisis adult
    If Maleflg Then                         'this is male adult
        CalTab = WTTAB1                         'Load male adult table.
    Else                                    'this is female child
        CalTab = WTTAB2                         'Load female adult table.
    End If
    '((feet – 4) * 12) + inches
    Howtall = ((session("feet") – 4) * 12) + session("inches")
    temp0 = Howtall
End If
ptr = 0
Temp6 = CalTab(ptr)                         'Temp6 = 1st table value.
ptr = ptr + 1
Temp7 = CalTab(ptr)                         'Temp7 = 2nd table value.
ptr = ptr + 1
Do
    Temp1 = CalTab(ptr)                     'Temp1 = 3rd table value.
    ptr = ptr + 1
    Temp4 = CalTab(ptr)                     'Temp4 = 4th table value.
    ptr = ptr + 1
    Temp5 = CalTab(ptr)                     'Temp5 = 5th table value.
    ptr = ptr + 1
    A = temp0                               'Adj inches to A
    A = A – Temp1                               'A = Adj inches – 3rd table value.
    If A < 0 Then                           'adjusted inches is negative
        A = temp0                           'Else get adj inches to Acc.
        temp0 = 0                           'Set temp0 to 0.
    Else
        temp0 = A                           't0 = adj inches – 3rd tab val.
        A = Temp1
    End If
    B = A                                   'Get 3rd table value to B.
    A = Temp4
```

TABLE 1-continued

```
        Temp4 = B                            'Exchange 3rd and 4th table values.
        A = A * B                            ' 4th table value times 3rd table value.
        Temp6 = (A − (Int(A / 256)) * 256) + Temp6 'lo byte
        If Temp6 − 255 > 0 Then              'Temp6 greater then 255
            Temp6 = Temp6 − 256
            Temp7 = Temp7 + 1
        End If
        Temp7 = (Int(A / 256)) + Temp7
        A = Temp5                            'Get 5th table value to A.
        B = Temp4                            'Get 3rd table value to B.
        Temp7 = (A * B) + Temp7              '5th table value times 3rd table value
Loop Until temp0 = 0
If Not Mediumflg Then                       'small and large builds
    Temp1 = Temp6                           ' Get temp6 to temp1.
    Temp2 = Temp7                           ' Get temp7 to temp2.
    A = ((Temp2 * 256) + Temp1) / 12
    Temp2 = Int(A / 256)
    Temp1 = A − (Temp2 * 256)
        If Not Smallflg Then                'large build
            Temp6 = Temp1 + Temp6
            Temp7 = Temp2 + Temp7
        Else                                'Ideal small
            Temp6 = Temp6 − Temp1
            Temp7 = Temp7 − Temp2
        End If
Else                                        ' medium build
    A = Temp6                               ' Get temp6 to Acc.
    If A >= 128 Then
        Temp7 = Temp7 + 1
    End If
End If
IdealLo = Temp7
WeightText = WeightText + "Ideal Low Weight = " & IdealLo & "<br>"
Temp1 = Temp7
Temp2 = 0
Temp5 = 3
Temp2 = Temp7
Temp1 = Temp6
A = ((Temp2 * 256) + Temp1) / 10
Temp2 = Int(A / 256)
Temp1 = A − Temp2 * 256
A = Temp1 + Temp6
If A >= 128 Then
    Temp2 = Temp2 + 1
End If
IdealHi = Temp2 + IdealLo
WeightText = WeightText + "Ideal High Weight = " & IdealHi & "<br>"
'LCALL PRN_IDEALDEC
If Maleflg = True Then
    addtxt = "Male"
Else
    addtxt = "Female"
End If
addtxt = addtxt & "<br>"
WeightText = WeightText & "Sex = " & addtxt
'LCALL PRN_SEX
If Smallflg = True Then
    addtxt = "Small"
Else
            If Mediumflg = True Then
        addtxt = "Medium"
            Else
        addtxt = "Large"
    end if
End If
WeightText = WeightText & "Build = " & addtxt & "<br>"
If Lowflg = True Then
    addtxt = "Low"
Else
            If Avgflg = True Then
        addtxt = "Medium"
            Else
        addtxt = "High"
    end if
End If
WeightText = WeightText & "Activity Level = " & addtxt & "<br>"
'LCALL PRN_BUILD
WeightText = WeightText & "Height = " & session("feet") & " feet " _
                    & session("inches") & " inches." & "<br>"
'LCALL PRN_HEIGHT
```

TABLE 1-continued

```
WeightText = WeightText & "Date of Birth: " & session("month") & "/"
    & session("day") & "/" & session("year") & "<br>"
'print date of birth
'check if this is a child and print child message if it is and exit
If Childflg = True Then
        WeightText = WeightText & "Youths' ideal weights vary greatly." & "<br>" _
            & "Consult a physician for your exact ideal weight." & "<br>"
            underoverText ="Youths' ideal weights vary greatly." & "<br>" _
            & "Consult a physician for your exact ideal weight."
Else
' *** ROUTINE TO GET UNDER OR OVER WEIGHT VALUES ***
    overwgtozs = 0
    underwgtozs = 0
    overwgtlbs = session("lbs") − IdealHi            'overwgt = Actual − IdealHi
    If overwgtlbs > 0 Then                           'Actual > Ideal so over wgt.
        If overwgtlbs > 20 Then                      '20lbs or more over weight.
            over20flg = True
        Else
            over20flg = False
        End If
        OverWgtflg = True
        UnderWgtflg = False
        overwgtozs = session("ozs")
    Else                                             'Not over weight.
        OverWgtflg = False
        over20flg = False
    End If
    underwgtlbs = IdealLo − session("lbs")           'underwgt = IdealLo − actual
    If underwgtlbs > 0 Then                          'Ideal > actual so under wgt.
        UnderWgtflg = True
        If session("ozs") > 0 Then
            underwgtlbs = underwgtlbs − 1
            underwgtozs = 16 − session("ozs")
        End If
    Else
        UnderWgtflg = False                          'Not under weight.
    End If
' *** END ROUTINE TO GET UNDER OR OVER WEIGHT VALUES ***
    If OverWgtflg = True Then                        ' This is over weight
        weightText = WeightText & "You are " & overwgtlbs & " lbs " & overwgtozs & " ozs over" _
                    & " your suggested ideal weight." & "<br>"
        underoverText = "You are " & overwgtlbs & " lbs " & overwgtozs & " ozs over" _
                    & " your suggested ideal weight."
    ElseIf UnderWgtflg = True Then ' This is under weight
        weightText = weightText & "You are " & underwgtlbs & " lbs " & underwgtozs & " ozs under" _
                    & " your suggested ideal weight."& "<br>"
        underoverText = "You are " & underwgtlbs & " lbs " & underwgtozs & " ozs under" _
                    & " your suggested ideal weight."
    Else                                             ' This is within normal weight range
        weightText = weightText & "You are within your suggested ideal" _
                    & " weight range." & "<br>"
        underoverText = "You are within your suggested ideal" _
                    & " weight range."
    End If
End If
    ' *** ROUTINE TO CALCULATE AND PRINT CALORIE TICKET ***
    Dim reqcal
    Dim sugcal
    Dim days
    If Childflg = True And Age12flg = False Then ' less then 12 years old - youth ticket
        reqcal = Age / 183
        'round up for remainder?
        reqcal = reqcal * 100
        reqcal = reqcal / 2
        reqcal = reqcal + 1000
    Else ' over 12 years old - adult ticket
        reqcal = session("lbs") + (session("ozs") / 16)
        reqcal = reqcal / 22
        reqcal = reqcal * 24
        reqcal = reqcal / 10
        reqcal = reqcal * ActLev
    End If
    If Femaleflg = True Then                         'This is female
        reqcal = reqcal * 9
        reqcal = reqcal / 10
        If reqcal < 1200 Then
            reqcal = 1200
        End If
    Else                                             'This is male
        If reqcal < 1500 Then
```

TABLE 1-continued

```
            reqcal = 1500
        End If
    End If
    reqcal = Int(reqcal)
    CalorieText = "Your body currently burns " & reqcal & " calories daily." & "<br>"
    sugcal = reqcal                          ' Preset suggested value
    If OverWgtflg = True Then                ' this is overweight
        CalorieText = CalorieText & " Decrease calorie intake by "
        If over20flg = False Then            ' This is less then 20 lbs over weight.
            sugcal = reqcal – 500            ' subtract 500.
            CalorieText = CalorieText & "500 "
        Else                                 ' this is over 20 lbs over weight
            sugcal = reqcal – 750            ' subtract 750.
            CalorieText = CalorieText & "750 "
        End If
    Else 'this is normal weight or under weight
        If UnderWgtflg = True Then           ' this is under weight
            sugcal = reqcal + 750
            CalorieText = CalorieText & " Increase calorie intake by "
            CalorieText = CalorieText & "750 "
        Else ' this is normal weight
            CalorieText = CalorieText & " Adjust calorie intake by 0 "
        End If
    End If
    CalorieText = CalorieText & " calories a day to "
    CalorieText = CalorieText & sugcal & " calories a day with "
'CALTIC11:
    If OverWgtflg = True Then                ' This is over weight
        sugcal = sugcal / 100
        sugcal = sugcal * 25
        sugcal = sugcal / 9
    Else                                     ' This is not over weight
        sugcal = reqcal
        sugcal = sugcal / 100
        sugcal = sugcal * 30
        sugcal = sugcal / 9
    End If
    sugcal = Int(sugcal)
    CalorieText = CalorieText & sugcal & " fat grams or less." & "<br>"
    CalorieText = CalorieText & " It will take approx. "
    If UnderWgtflg = False And OverWgtflg = False Then ' This is normal weight
        days = 0
    ElseIf UnderWgtflg = True Then ' This is under weight
        days = (underwgtlbs * 350) / 75
    Else ' This is over weight
        days = overwgtlbs * 35
        If over20flg = True Then ' This is over 20 pounds over weight
            days = (days * 10) / 75
        Else ' This is less then 20 pounds over weight
            days = days / 5
        End If
    End If
    CalorieText = CalorieText & round(days) & " days following suggested diet to change" _
        & " current weight to your ideal weight." & "<br>"
```

The present invention has been described in considerable detail with reference to certain preferred versions thereof; however, other versions are possible. Therefore, the spirit and scope of the appended claims should not be limited to the description of the preferred versions contained herein.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As is known to those skilled in the art, the aforementioned example architectures described above, according to the present invention, can be implemented in many ways, such as program instructions for execution by a hardware processor, as software modules, microcode, as computer program product on computer readable media, as logic circuits, as application specific integrated circuits, as firmware, as consumer electronic devices, etc., in wireless devices, in wireless transmitters/receivers, in wireless networks, etc. Further, embodiments of the invention can take the form of an entirely hardware embodiment, an entirely software embodiment or an embodiment containing both hardware and software elements.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allows a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the multi-core processor to perform the features of the computer system. Accordingly, such computer programs represent controllers of the computer system. The computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An electronic weighing device, comprising:
an elongate frame;
a head unit, wherein the head unit is supported by the frame;
a scale platform coupled to a base of the frame;
a load-cell module residing in the scale platform, wherein the load-cell module is configured to convert a force on the scale platform when a user stands on the scale platform, into a measurable electrical output signal;
an electronic display device in the head unit;
an electronics module coupled to the load-cell module and to the electronic display device, wherein the electronics module is configured for interacting with a user via the electronic display device and determining the weight of the user based on an electrical output signal from the load-cell; and
a communication module configured for communicating with a remote device via a communication link;
wherein the electronics module is further configured for exchanging user data with a remote server device that stores user data for multiple users, and receiving information from the remote server device based on said user data.

2. The device of claim 1, wherein:
the remote server device comprises a web server configured for communication with one or more of: user devices and electronic weighing devices.

3. The device of claim 2, wherein:
the electronic display device comprises a touch-screen display configure for receiving input data from, and displaying output data to, a user.

4. The device of claim 2, wherein the electronics module further comprises:
a user interface module configured for interacting with a user, wherein the user interface module is configured for controlling an input module for receiving user input, and controlling the electronic display device for displaying information using a graphical user interface (GUI); and
a processing module configured for controlling the user interface module for user interaction, the processing module further configured for generating output data based on input data, wherein the input data includes an electrical output signal from the load-cell and user input data received from a user via the user interface, and wherein the output data includes the determined weight of a user standing on the platform.

5. The device of claim 4, further comprising a power module configured for providing electrical power to the electronics module.

6. The device of claim 4, wherein:
the communication module is further configured for communicating with a user electronic device utilizing a communication link.

7. The device of claim 6, wherein:
the communication module is further configured for communicating with a user electronic device utilizing a Simple Mail Transfer Protocol (SMTP) protocol via a communication link; and
the processing module is further configured for communicating with a remote server via a communication link using the communication module.

8. The device of claim 7, wherein:
the processing module is further configured for receiving information from the remote server to display via the GUI.

9. The device of claim 8, wherein the processing module is further configured to request user input data comprising one or more of:
a gender of the user;
a height of the user;
a date of birth of the user;
a body shape of the user; and
an activity level of the user.

10. The device of claim 9, wherein the processing module is further configured to generate output data based on user input data and the load-cell output signal, the output data comprising one or more of:
a calculated weight of the user;
an ideal weight of the user;
a body mass index (BMI) of the user;
a suggested daily caloric intake of the user; and
biorhythm cycle values of the user.

11. The device of claim 8, wherein:
the processing is module is further configured to display customized advertising to the user based on the user input and aggregated information for users at the remote server device.

12. The device of claim 8, further comprising:
a currency module configured for receiving a user payment before generating output data for the user;
wherein the electronic weighing device communicates the user payment information to the remote server device.

13. The device of claim 8, further comprising:
a data storage module configured for storing information including user input data and the output data;
wherein the processing module is further configured to display information from the remote server device on the GUI.

14. The device of claim 4, wherein:
the processing module is further configured to receive user selection via the GUI indicating a destination for the output data, wherein the destination includes one or more of: electronic mail address, text message address and phone number; and
the processing module is further configured to transmit the output data to one or more destinations indicated by the user.

15. The device of claim 4, further comprising an application module controllable by the remote server device for controlling the processing module.

16. A method for electronically weighing a user, comprising:
when a user stands on a scale platform of the electronic weighing device, generating output data including the weight of the user based on an electrical output signal from a load-cell in the scale platform, wherein the load-cell converts a force on the scale platform into a measurable electrical output signal;
transmitting data to a remote server device via a communication link, wherein the remote server device stores user data for multiple users; and
receiving information from the remote server device based on said user data.

17. The method of claim 16, wherein the remote server device comprises a web server configured for communication with one or more of: user devices and electronic weighing devices.

18. The method of claim 17, further comprising transmitting the output data to a user device.

19. The method of claim 17, further comprising:
receiving input data from a user of the electronic weighing device, and
generating output data including the weight of the user based on the user input data and the electrical output signal from a load-cell in the scale platform.

20. The method of claim 19, wherein the input data includes one or more of:
a gender of the user;
a height of the user;
a date of birth of the user;
a body shape of the user; and
an activity level of the user.

21. The method of claim 20, wherein the output data includes one or more of:
a calculated weight of the user;
an ideal weight of the user;
a body mass index (BMI) of the user;
a suggested daily caloric intake of the user; and
biorhythm cycle values of the user.

22. The method of claim 17, further comprising:
receiving user selection indicating a destination for the output data, wherein the destination includes one or more of: electronic mail address, text message address and phone number; and
transmitting the output data from the electronic weighing device to one or more destinations indicated by the user.

23. The method of claim 17, further comprising exchanging information between the remote server device and one or more users via one or more user devices.

24. The method of claim 23, further comprising:
receiving user selection indicating a destination for the output data, wherein the destination includes one or more of: electronic mail address, text message address and phone number; and
transmitting the output data from the remote server device to one or more destinations indicated by the user.

25. The method of claim 16, further comprising:
prior to generating the output data, receiving a payment from the user.

26. The method of claim 17, further comprising:
providing the electronic weighing device, the electronic weighing device comprising:
an elongate frame;
a head unit, wherein the head unit is supported by the frame;
a scale platform coupled to a base of the frame;
a load-cell module residing in the scale platform, wherein the load-cell module is configured to convert a force on the scale platform when a user stands on the scale platform, into a measurable electrical output signal;
an electronic display in the head unit;
an electronics module coupled to the load-cell module and to the electronic display device, wherein the electronics module is configured for interacting with a user via the electronic display and calculating the weight of the user based on an electrical output signal from the load-cell; and
a communication module configured for communicating with another device via a communication link.

27. The method of claim 26, wherein the head unit further comprises:
a rectilinear housing having a front face plate and a back cover; and a touch-screen LCD capable of receiving the input data from and displaying the output data to a user;
wherein the head unit is angled on the frame for optimal reading and interaction.

28. The method of claim 16, further comprising controlling operation of one or more of the electronic weighing devices from the remote server device.

29. The method of claim 19, wherein:
transmitting the output data to a remote device via a communication link communication module comprises transmitting to an SMTP server a message addressed to the user, the message comprising the output data; and
the method further comprising transmitting the user input data and the output data to a remote server device.

30. A system, comprising:
one or more electronic weighing devices; and
a remote server device configured for interaction with one or more of the electronic weighing devices via a communication link;
wherein the remote server device comprises:
   a communication module for communication with said one or more electronic weighing devices; and
   a controller module configured to:
      receive information from one or more of the electronic weighing devices for one or more users;
      store the received information in a database; and
      based on the received information, generate data for transmission to one or more destinations;
wherein each electronic weighing device comprises:
   a head unit, wherein the head unit is supported by a frame;
   a scale platform coupled to a base of the frame;
   a load-cell module residing in the scale platform, wherein the load-cell module is configured to convert a force on the scale platform when a user stands on the scale platform, into a measurable electrical output signal;
   an electronic display in the head unit;
   an electronics module coupled to the load-cell module and to the electronic display device, wherein the electronics module is configured for: interacting with one or more users via the electronic display and determining the weight of each user based on an electrical output signal from the load-cell and exchanging user data with a remote server device that stores user data for multiple users, and receiving information from the remote server device based on said user data;
   a communication module configured for communicating with another device via a communication link.

31. The system of claim 30, wherein:
the controller module of the remote server device is configured for:
   receiving information from at least one of the electronic weighing devices, the received information including one or more of: user input data and output data generated for the user by the electronics module; and
   based on the received information, transmitting information to at least one of the electronic weighing devices.

32. The system of claim 31, wherein the controller module of the remote server device is further configured for transmitting data to at least one of the electronic weighing devices via the communication link for display via a graphical user interface (GUI) of the electronic weighing device.

33. The system of claim 32, wherein the electronics module in each electronic weighing device further comprises:
   a user interface module configured for interacting with a user, wherein the user interface module is configured for controlling an input module for receiving user input, and controlling the electronic display device for displaying information using a graphical user interface (GUI); and
   a processing module configured for controlling the user interface module for user interaction, the processing module further configured for generating output data based on input data, wherein the input data includes an electrical output signal from the load-cell and user input data received from a user via the user interface, and wherein the output data includes the determined weight of a user standing on the platform.

34. The system of claim 32, wherein the controller module of the remote server device is configured for generating data based on the received information and transmitting said data to at least one of the electronic weighing devices via the communication link for display to the user on the electronic display.

35. The system of claim 31, wherein the controller module of the remote server device is configured to aggregate user data and analyze the aggregated user data to generate related information.

36. The system of claim 35, wherein the controller module of the remote server is further configured to analyze user data and generate marketing information based on the user data.

37. The system of claim 35, wherein the controller module of the remote server device is configured to aggregate user data for multiple users and provide information to one or more users based on the aggregated user data.

38. The system of claim 31, wherein the remote server device comprises a web server configured for communication with one or more of: user devices and electronic weighing devices.

39. The system of claim 38, wherein the controller module of the remote server device is further configured for communicating with one or more users via one or more user devices utilizing a communication link.

40. The system of claim 38, wherein the controller module of the remote server device is further configured for communicating with one or more users via one or more electronic weighing devices utilizing a communication link.

41. The system of claim 31, wherein the controller module of the remote server device is further configured for transmitting data to one or more the electronic weighing devices to control operation of the one or more the electronic weighing devices.

* * * * *